US012056823B2

(12) United States Patent
Bouny et al.

(10) Patent No.: US 12,056,823 B2
(45) Date of Patent: Aug. 6, 2024

(54) SEGMENTING THREE-DIMENSIONAL MESHES IN GRAPHICAL APPLICATIONS BASED ON DETECTION OF ELONGATED SHAPES

(71) Applicant: Adobe Inc., San Jose, CA (US)

(72) Inventors: Jeremy Bouny, Clermont-Ferrand (FR); Jean-Francois El Hajjar, Clermont-Ferrand (FR)

(73) Assignee: Adobe Inc., San Jose, CA (US)

( * ) Notice: Subject to any disclaimer, the term of this patent is extended or adjusted under 35 U.S.C. 154(b) by 174 days.

(21) Appl. No.: 17/356,454

(22) Filed: Jun. 23, 2021

(65) Prior Publication Data
US 2022/0414986 A1 Dec. 29, 2022

(51) Int. Cl.
G06T 17/20 (2006.01)
G06T 7/136 (2017.01)
G06T 15/04 (2011.01)

(52) U.S. Cl.
CPC ............ G06T 17/205 (2013.01); G06T 7/136 (2017.01); G06T 15/04 (2013.01)

(58) Field of Classification Search
CPC ........ G06T 17/205; G06T 7/136; G06T 15/04
See application file for complete search history.

(56) References Cited

U.S. PATENT DOCUMENTS 4,796,497 A * 1/1989 Morita .................... D06H 7/02
83/365

8,004,517 B1 * 8/2011 Edelsbrunner .......... G06T 17/20
345/611
2004/0075656 A1 * 4/2004 Kimia .................... G06T 17/00
345/420

(Continued)

FOREIGN PATENT DOCUMENTS

WO WO2005076197 * 8/2005 ............... G06T 7/00

OTHER PUBLICATIONS

Serna (Segmentation of elongated objects using attribute profiles and area stability: application to melanocyte segmentation. (Year: 2010).*

(Continued)

*Primary Examiner* — Phuc N Doan
(74) *Attorney, Agent, or Firm* — Kilpatrick Townsend & Stockton LLP

(57) ABSTRACT

Described herein are techniques for segmenting a mesh to reduce or remove elongated shapes, to enable texturing a three-dimensional (3D) mesh. An embodiment described is a method in which one or more processing devices perform operations that include accessing segments of the 3D mesh and detecting that a first segment is elongated. The operations include modifying the segments of the 3D mesh by subdividing the first segment into two or more sub-segments, based on the first segment being elongated. The operations include assigning, for each 3D vertex of the two or more sub-segments, respective two-dimensional (2D) coordinates in a texture map. The operations further include applying a texture to the 3D mesh. Application of the texture involves mapping the 3D vertices of the two or more sub-segments based on the respective 2D coordinates corresponding to the 3D vertices of the two or more sub-segments according to the texture map.

20 Claims, 15 Drawing Sheets

(56) References Cited

U.S. PATENT DOCUMENTS

| | | | | |
|---|---|---|---|---|
| 2005/0093862 | A1* | 5/2005 | Boier-Martin | G06F 18/00 345/420 |
| 2007/0296719 | A1* | 12/2007 | Sander | G06T 17/20 345/423 |
| 2012/0047098 | A1* | 2/2012 | Reem | G06T 11/206 706/12 |
| 2017/0221263 | A1* | 8/2017 | Wei | G06T 15/04 |
| 2021/0109242 | A1* | 4/2021 | Salman | G01V 1/345 |

OTHER PUBLICATIONS

Joan-Arinyo, Computing the Medial Axis Transform of Polygonal Domains by Tracing Paths, URL: https://www.math.stonybrook.edu/~bishop/classes/math626.F08/10.1.1.41.3080.pdf.*

Bal, Skeleton-Based Recognition of Shapes in Images via Longest Path Matching, Springer International Publishing Switzerland & The Association for Women in Mathematics 2015, DOI 10.1007/978-3-319-16348-2_6 (Year: 2015).*

Drazic, Shape elongation from optimal encasing rectangles, Computers & Mathematics with Applications vol. 60, Issue 7, Oct. 2010, pp. 2035-2042, DOI https://doi.org/10.1016/j.camwa.2010.07.043 (Year: 2010).*

Smith, Bijective Parameterization with Free Boundaries, Texas A&M University, URL: https://people.engr.tamu.edu/schaefer/research/bijective.pdf, 9 pages. (Year: 2015).*

Bulterman et al., On Computing a Longest Path in a Tree, Information Processing Letters, vol. 81, No. 2, Jan. 31, 2002, p. 93 of 93-96.

Fortune, A Sweepline Algorithm for Voronoi Diagrams, In Proceedings of the Second Annual Symposium on Computational Geometry, Association for Computing Machinery, Aug. 1986, pp. 313-322.

Hanocka et al., MeshCNN: A Network with an Edge, ACM Transactions on Graphics (TOG), vol. 38, No. 4, Article 90, Jul. 2019, pp. 1-12.

Leao et al., Irregular Packing Problems: A Review of Mathematical Models, European Journal of Operational Research, vol. 282, No. 3, May 1, 2020, abstract of pp. 803-822.

Lee, Medial Axis Transformation of a Planar Shape, IEEE Transactions on Pattern Analysis and Machine Intelligence, vol. 4, No. 4, Apr. 1982, pp. 363-369.

Li et al., OptCuts: Joint Optimization of Surface Cuts and Parameterization, ACM Transactions on Graphics, vol. 37, No. 6, Article 247, Nov. 2018, pp. 247:1-247:13.

Lien et al., Approximate Convex Decomposition of Polygons, In Proceedings of the Twentieth Annual Symposium on Computational Geometry (SCG '04, Brooklyn, NY), Association for Computing Machinery, Jun. 9-11, 2004, pp. 17-26.

Limper et al., Box Cutter: Atlas Refinement for Efficient Packing via Void Elimination, ACM Transactions on Graphics, vol. 37, No. 4, Article 153, Aug. 2018, pp. 153:1-153:13.

Liu et al., Atlas Refinement with Bounded Packing Efficiency, ACM Transactions on Graphics, vol. 38, No. 4, Article 33, Jul. 2019, pp. 33:1-33:13.

Mayya et al., Voronoi Diagrams of Polygons: A Framework for Shape Representation, Journal of Mathematical Imaging and Vision, vol. 6, No. 4, Dec. 1996, pp. 1-32 (preprint).

Poranne et al., AutoCuts: Simultaneous Distortion and Cut Optimization for UV Mapping, ACM Transactions on Graphics, vol. 36, No. 6, Article 215, Nov. 2017, pp. 215:1-215:11.

Shapira et al., Consistent Mesh Partitioning and Skeletonisation Using the Shape Diameter Function, The Visual Computer, vol. 24, No. 4, Mar. 2008, pp. 249-259.

Sharp et al., Variational Surface Cutting, ACM Transactions on Graphics, vol. 37, No. 4, Article 156, Aug. 2018, pp. 156:1-156:13.

Zhang et al., Robust Atlas Generation via Angle-Based Segmentation, Computer Aided Geometric Design, vol. 79, No. 101854, May 2020, abstract.

Zhou et al., Iso-Charts: Stretch-Driven Mesh Parameterization Using Spectral Analysis, In Proceedings of the 2004 Eurographics/ACM SIGGRAPH Symposium on Geometry Processing, Association for Computing Machinery, Jul. 2004, pp. 45-54.

* cited by examiner

SEGMENTING THREE-DIMENSIONAL MESHES IN GRAPHICAL APPLICATIONS BASED ON DETECTION OF ELONGATED SHAPES

TECHNICAL FIELD

This disclosure generally relates to computer graphics and, more specifically, to segmenting three-dimensional meshes in graphical applications based on detection of elongated shapes.

BACKGROUND

In graphics applications, objects are often represented by three-dimensional (3D) models, which can take the form of 3D meshes. A graphics application can then manipulate the 3D model to provide a desired depiction of a corresponding object. For instance, the graphics application can modify the shape of the 3D model or change its surface appearance. The resulting 3D model can be used in various contexts, such as in engineering modeling or real-time video gaming.

Three-dimensional modeling often involves applying a material, sometimes including a set of textures, to a 3D model representing an object to provide a textured model with desired appearance of the object's surface. For example, a texture can provide a certain finish, such as a color or pattern, shading, or geometry, such that changing textures can change the appearance of the object. Typically, application of a texture requires associating each vertex of a 3D mesh to 2D texture coordinates. This process typically involves the following operations: dividing a 3D mesh acting as the 3D model into charts, also referred to herein as segments; flattening the charts into islands, also referred to herein as flattened segments or two-dimensional (2D) segments; and packing the islands into a 2D area such as a square unit. The result maps each 3D vertex of each chart to a particular set of 2D coordinates.

The output of the above process can be used during texture-mapping to texture map a texture image to a 3D mesh so as to enable rendering of a textured mesh. In that case, each parcel of the surface of the 3D mesh is texture-mapped using the signals contained in the texture image normalized to the square unit. Thus, the texture-mapping process enables application of sub-tessellation details to a mesh.

SUMMARY

In some embodiments, a computing system implementing a mesh-segmentation system described herein accesses segments, or charts, of a mesh. The mesh could model an object, such as a real-life object or a virtual or imagined object. For instance, the mesh is a set of connected triangles or other polygons that together describe a surface of the object.

The computing system analyzes the segments and detects a first segment among the segments that is an elongated shape. Based on detecting that the first segment is an elongated shape, the computing system implementing the mesh-segmentation system subdivides the first segment. To this end, the mesh-segmentation system partitions the vertices of the first segment into groups and then constructs a respective new segment, also referred to as a sub-segment, including the vertices in a corresponding group. The mesh-segmentation system replaces the first segment, in the segments of the mesh, with the sub-segments.

Given the updated segments, the computing system packs flattened versions of the segments, also referred to as islands, into a two-dimensional area. Based on the results of the packing, when given a texture image, the computing system performs texture mapping to texture the mesh, thereby augmenting the mesh with sub-tessellation details. The resulting textured mesh may have a higher texel density than would be case for a textured model using the first segment, given that the elongation of the first segment.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
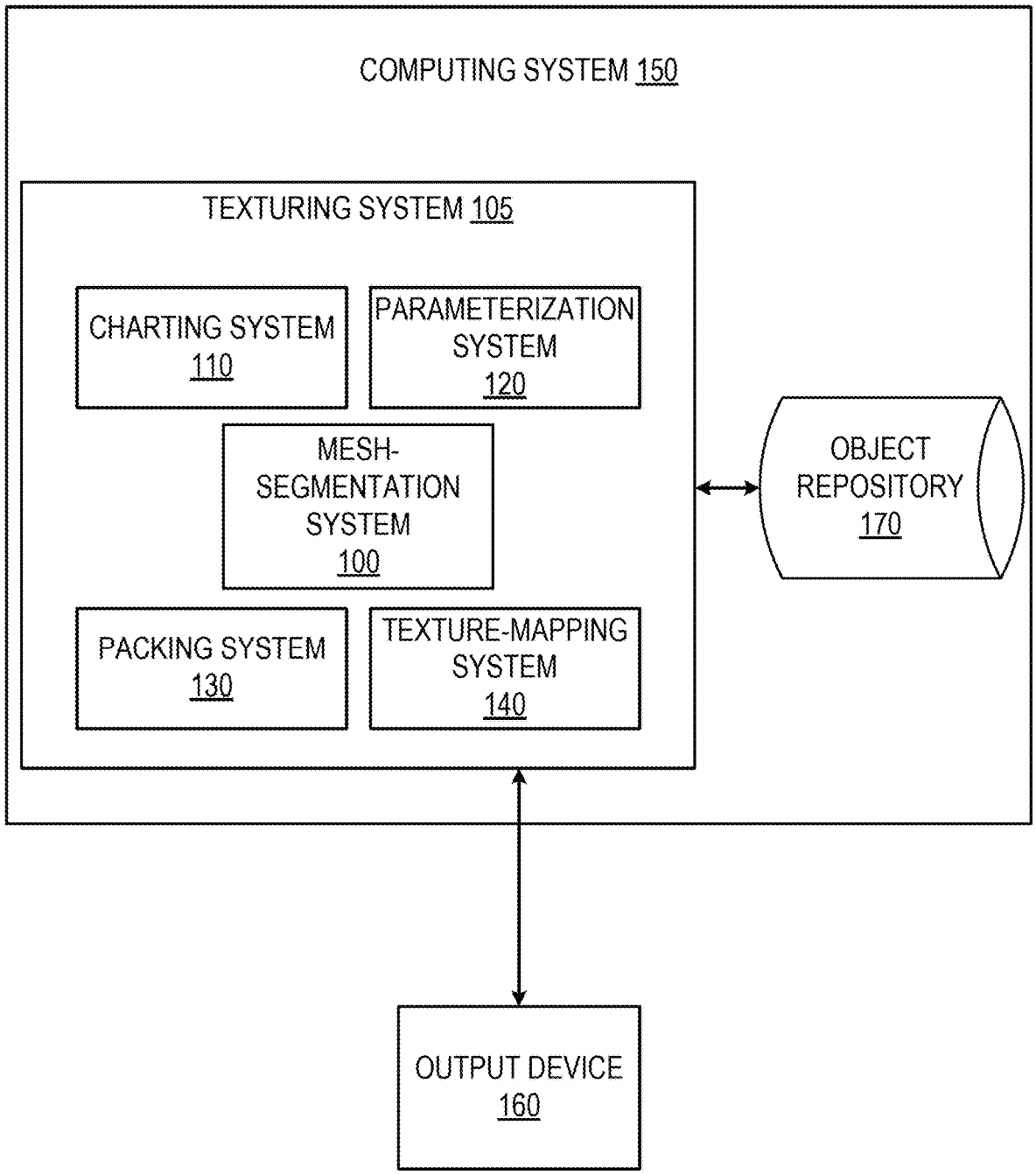
FIG. 1 shows an example of a mesh-segmentation system included as part of a texturing system, according to certain embodiments of this disclosure.

The present disclosure includes systems and methods for segmenting a three-dimensional (3D) mesh to remove elongated shapes, by detecting elongated shapes among the charts of the 3D mesh and, further, by dividing such an elongated shape into less elongated segments.

Conventionally, the application of a texture can have undesirable results in the case where one or more charts of a 3D mesh, also referred to herein as a mesh, have an elongated shape. As described above, texturing a mesh typically involves dividing the mesh into segments, also referred to as charts, flattening the segments into islands, and packing the segments into a two-dimensional (2D) area (i.e., a bounded shape). The operation of packing the islands into the 2D area involves sizing the islands to a common scale to fit all islands into the 2D area while avoiding overlap and minimizing wasted space (i.e., the portion of the 2D area not associated with any islands). The existence of an elongated shape requires all the islands to be resized to fit the elongated shape into the 2D area. Often, this results in a large amount of wasted space, which leads to undesirably low texel density (i.e., the density of pixels mapped from a texture image being applied) in the final textured model.

Certain embodiments described herein improve upon conventional techniques by automatically detecting each chart that is an elongated shape and by further segmenting each such chart. The following non-limiting example is provided to introduce certain embodiments. In this example, a mesh-segmentation system described herein inputs an initial set of charts from a 3D mesh and outputs an updated set of charts of the 3D mesh, where the updated set includes a greater quantity of charts than does the initial set due to one or more of the charts in the initial set having been subdivided to remove elongation.

In this example, a computing system implementing the mesh-segmentation system accesses segments, or charts, of a mesh. The mesh could model an object, such as a real-life object or a virtual or imagined object. For instance, the mesh is a set of connected triangles or other polygons that together describe a surface of the object. The segments of the mesh could have been previously determined in various ways, such as by using one or more techniques known in the art.

In this example, the computing system analyzes the segments and detects a first segment among the segments that is an elongated shape. Specifically, the computing system computes a first representative axis representing one dimension of the first segment and a second representative axis representing another dimension of the first segment. The computing system further computes an elongation value as a ratio of the length of the first representative axis, which is longer of the two representative axes, over the second representative axis. If the elongation value exceeds a threshold elongation value, then the computing system deems the first segment to be an elongated shape.

Further, in this example, based on detecting that the first segment is an elongated shape, the computing system implementing the mesh-segmentation system subdivides the first segment further. To this end, the mesh-segmentation system partitions the vertices of the first segment into groups along the first representative axis, such that each group includes at least one vertex on each side of the first representative and no such group has a respective elongation value that exceeds the threshold elongation value. The mesh-segmentation system then constructs a respective new segment, also referred to as a sub-segment, with the vertices in each group. The mesh-segmentation system replaces the first segment, in the segments of the mesh, with the sub-segments.

In this example, the computing system then assigns each vertex of each chart to respective 2D coordinates, such as by packing the flattened segments, including the flattened sub-segments replacing the first segment, into a 2D area to create a texture map. The computing system applies the texture by mapping each 3D vertex of the mesh to the corresponding 2D coordinates in the texture map, using interpolation for coordinates of the mesh other than the vertices. The texture-mapping thus augments the mesh with sub-tessellation details. The resulting textured model could have a more desirable texel density (i.e., a higher texel density for some segments) than would be case if creating the textured model using the first segment, given that the elongation of the first segment.

Certain embodiments described herein facilitate graphical modeling by reducing or eliminating the occurrence of elongated shapes in a set of segments of a 3D mesh, thereby improving the texel density of a textured object. Embodiments herein described thus provide an improvement in the technical field of computer graphics by automatically, potentially without user intervention, improving the appearance of textured objects.

Referring now to the drawings, FIG. 1 shows an example of a mesh-segmentation system 100 included as part of a texturing system 105, according to certain embodiments of this disclosure. The directions of the various arrows shown in FIG. 1 illustrate an example communications flow; however, these directional arrows are provided for illustrative purposes only and do not limit the various embodiments described herein. The embodiment depicted in FIG. 1 is merely an example and is not intended to unduly limit the scope of claimed embodiments. Many possible variations, alternatives, and modifications are within the scope of this disclosure. For example, in some implementations, more or fewer systems or components than those shown in FIG. 1 may be provided, two or more systems or components may be combined, or a different configuration or arrangement of systems and components may be provided.

In some embodiments, the mesh-segmentation system 100 is implemented as part of one or more computing systems, such as the computing system 150 shown in FIG. 1. The mesh-segmentation system 100 is implemented as hardware, software (e.g., firmware), or a combination of hardware and software. For instance, the mesh-segmentation system 100 is integrated with an application, such as a computer-aided design (CAD) application, a drawing application, or some other application in which 3D models can be manipulated. Further, as shown in the example of FIG. 1, an embodiment of the mesh-segmentation system 100 is part of a larger texturing system 105 used to texture a 3D model based on segments determined by the mesh-segmentation system 100.

In the embodiment depicted in FIG. 1, the mesh-segmentation system 100 runs on the depicted computing system 150. The computing system 150 can be of various types, such as a server, a desktop computer, a notebook computer, a tablet, or a smartphone. An example of the mesh-segmentation system 100 is implemented as program code stored in a non-transitory computer-readable medium or as a specialized hardware device such as a field-programmable gate array. Additionally or alternatively, an example of the mesh-segmentation system 100 runs on a distributed system of computing devices. For example, the mesh-segmentation system 100 is implemented by one or more computing systems of a cloud service provider infrastructure.

As shown in FIG. 1, an embodiment of the texturing system 105 includes subsystems such as a charting system 110, the mesh-segmentation system 100, a parameterization system 120, a packing system 130, and a texture-mapping system 140. Generally, the charting system 110 determines seams along which to cut, or divide, a mesh to create segments, or charts, of the mesh; the mesh-segmentation system 100 further subdivides segments deemed to be elongated and thus replaces such segments with sub-segments; the parameterization system 120 assigns 2D spatial coordinates to each vertex of each resulting segment of the mesh, thereby flattening each segment; the packing system 130 packs the flattened segments into a 2D area to enable texturing the mesh; and the texture-mapping system 140 performs texture mapping on the mesh based on the packing results. Each of the charting system 110, the mesh-segmentation system 100, the parameterization system 120, the packing system 130, and the texture-mapping system 140 can be implemented as hardware, software, or a combination of hardware and software. Further, although the subsystems of the texturing system 105 are shown and described herein as being distinct from one another, this distinction is made for illustrative purposes only; the charting system 110, the parameterization system 120, the packing system 130, and the texture-mapping system 140 can share hardware or software or can be further subdivided. Various implementations are within the scope of disclosure.

In some embodiments, the computing system 150 further includes, or otherwise utilizes, an object repository 170, which is accessed by the texturing system 105 in some embodiments. The object repository 170 is, for example, a database, one or more tables of a database, one or more text files, or one or more other storage objects. For instance, the object repository 170 may be a portion of a storage device of the computing system 150. The object repository 170 maintains definitions of objects, such as in the form of a description of a set of polygons forming a mesh for each object. An example of the object repository 170 also maintains descriptions of segments of a mesh, and the mesh-segmentation system 100 directly or indirectly modifies such descriptions of segments upon subdividing a segment deemed to be an elongated shape. Additionally or alternatively, the object repository 170 maintains texture images used to texture such objects as described herein.

In some embodiments, the computing system 150 communicates with an output device 160 capable of rendering an output viewable by a user. For instance, the output device is a printer, a display screen, or another computing device such as a smartphone, tablet, or personal computer. Generally, an example of the texturing system 105 applies a texture to a mesh, such as a mesh described in the object repository 170, and outputs a description of the resulting textured object to the output device 160, which displays the textured object (i.e., the applicable mesh with applied texture).

Figure 2:
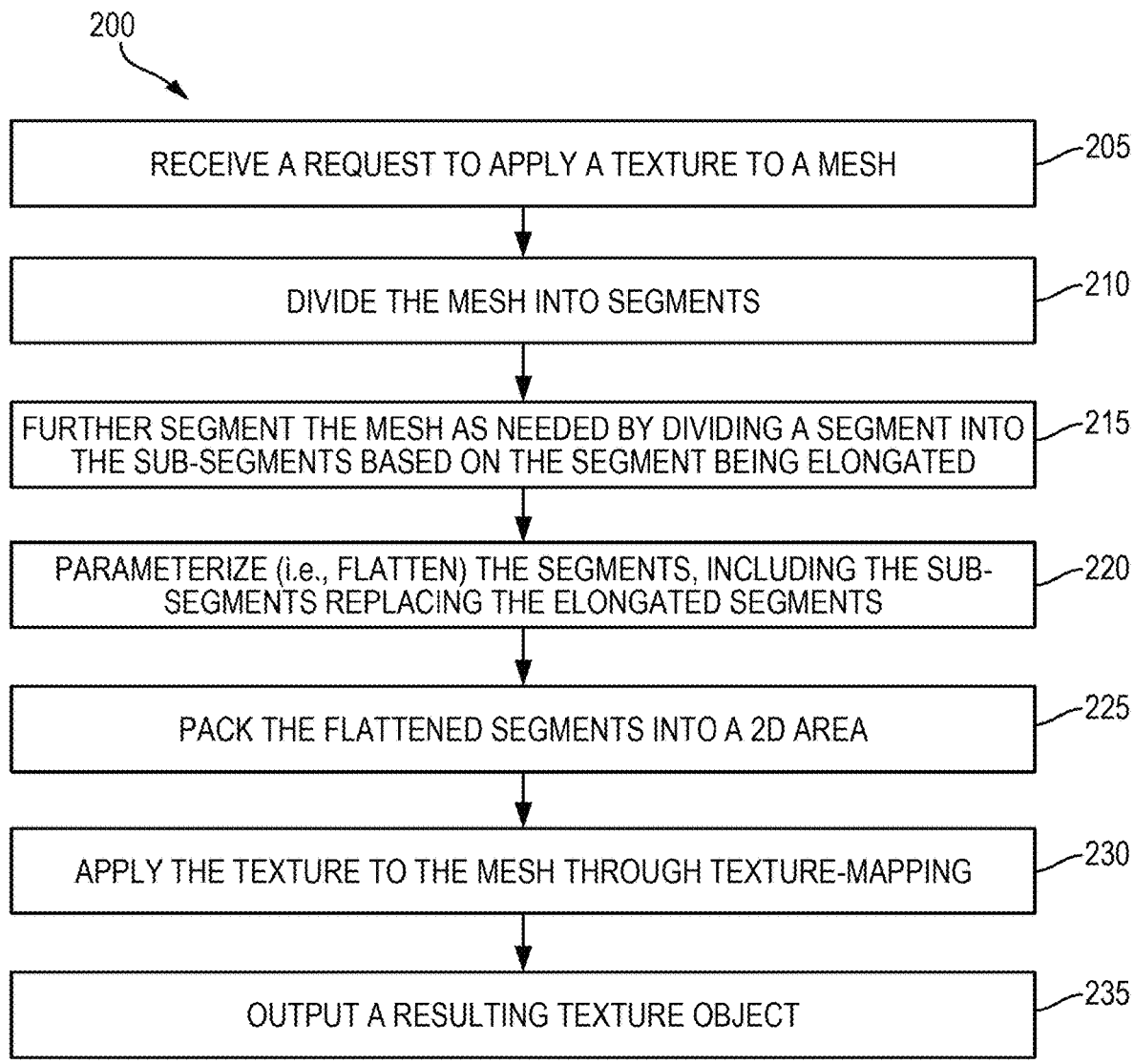
FIG. 2 shows an example of a process for texturing a three-dimensional (3D) mesh, according to certain embodiments of this disclosure.

FIG. 2 shows an example of a process 200 for texturing a three-dimensional (3D) model, according to certain embodiments of this disclosure. The process 200 depicted in FIG. 2 may be implemented in software (e.g., code, instructions, program) executed by one or more processing units of the computer system, implemented in hardware, or implemented in a combination of software and hardware. The process 200 presented in FIG. 2 and described below is intended to be illustrative and non-limiting. Although FIG. 2 depicts various processing operations occurring in a particular sequence or order, this is not intended to be limiting. In certain alternative embodiments, the processing may be performed in a different order or some operations may also be performed in parallel.

As shown, block 205 of the process 200 involves receiving a request to apply a texture to a mesh. For instance, the mesh is a model of an object, and the mesh includes a set of connected polygons forming a surface. In one example, the request is a user request, which can be made by the user through the user's use of a graphics application with which the mesh-segmentation system 100 is integrated. Alternatively, however, the request could be an automated request.

At block 210, the process 200 involves dividing the mesh into segments, or charts responsive to the request received at block 205. In some embodiments, the charting system 110 performs operations involved in dividing the mesh into segments, and such operations include determining seams along edges in the mesh and cutting the mesh along the seams to result in segments. In one example, a user selects the edges to be used as seams, but additionally or alternatively, the charting system 110 determines the seams automatically. Various techniques are known in the art for determining seams and dividing the mesh into segments, and one or more of such techniques can be used in some embodiments.

At block 215, the process 200 involves further segmenting the mesh by, for each segment deemed to be an elongated shape, dividing that segment into two or more sub-segments. In some embodiments, the mesh-segmentation system 100 described herein performs operations involved in further subdividing the segment. An example process executed by the mesh-segmentation system 100 to perform this further segmentation is described below with reference to FIG. 7. In some embodiments, the sub-segments of the segment replace that segment in the segments of the mesh for the purposes of the remaining operations in this process 200.

At block 220, the process 200 involves parameterizing (i.e., flattening) the segments determined at block 215 (i.e., with sub-segments replacing any segments deemed to be elongated shapes) by assigning each vertex of each segment respective 2D coordinates, which flattens the segments into islands. In some embodiments, the parameterization system 120 performs the parameterizing of the segments using one or more techniques known in the art.

At block 225, the process 200 involves packing the flattened segments (i.e., islands) resulting from block 220 into a two-dimensional area, such as a square unit. In some embodiments, the packing system 130 performs this operation using one or more techniques known in the art. In one example, the packing system seeks to optimize the packing by minimizing the amount of space in the 2D area that is wasted (i.e., not associated with any segment after the packing).

At block 230, the process 200 involves applying a texture through texture-mapping, using the packed islands determined at block 225. In some embodiments, for instance, the texture-mapping system 140 scales the 2D area in which the islands are packed to a texture image to form a texture map that maps each vertex of the segments to a corresponding pixel in the texture map. The texturing system 100 then applies the texture shown in the texture image by mapping the vertices of the mesh to the corresponding coordinates of the texture map and by interpolating in the texture map as needed to texture other coordinates in the mesh. Various techniques are known in the art for applying a texture based on the texture image and the packed islands determined above, and one or more such techniques may be used. The result is a textured mesh, also referred to herein as a textured object.

At block 235, the process 200 involves outputting the textured object determined at block 230. In one example, the textured object is rendered and displayed on an output device 160.

Figure 3:
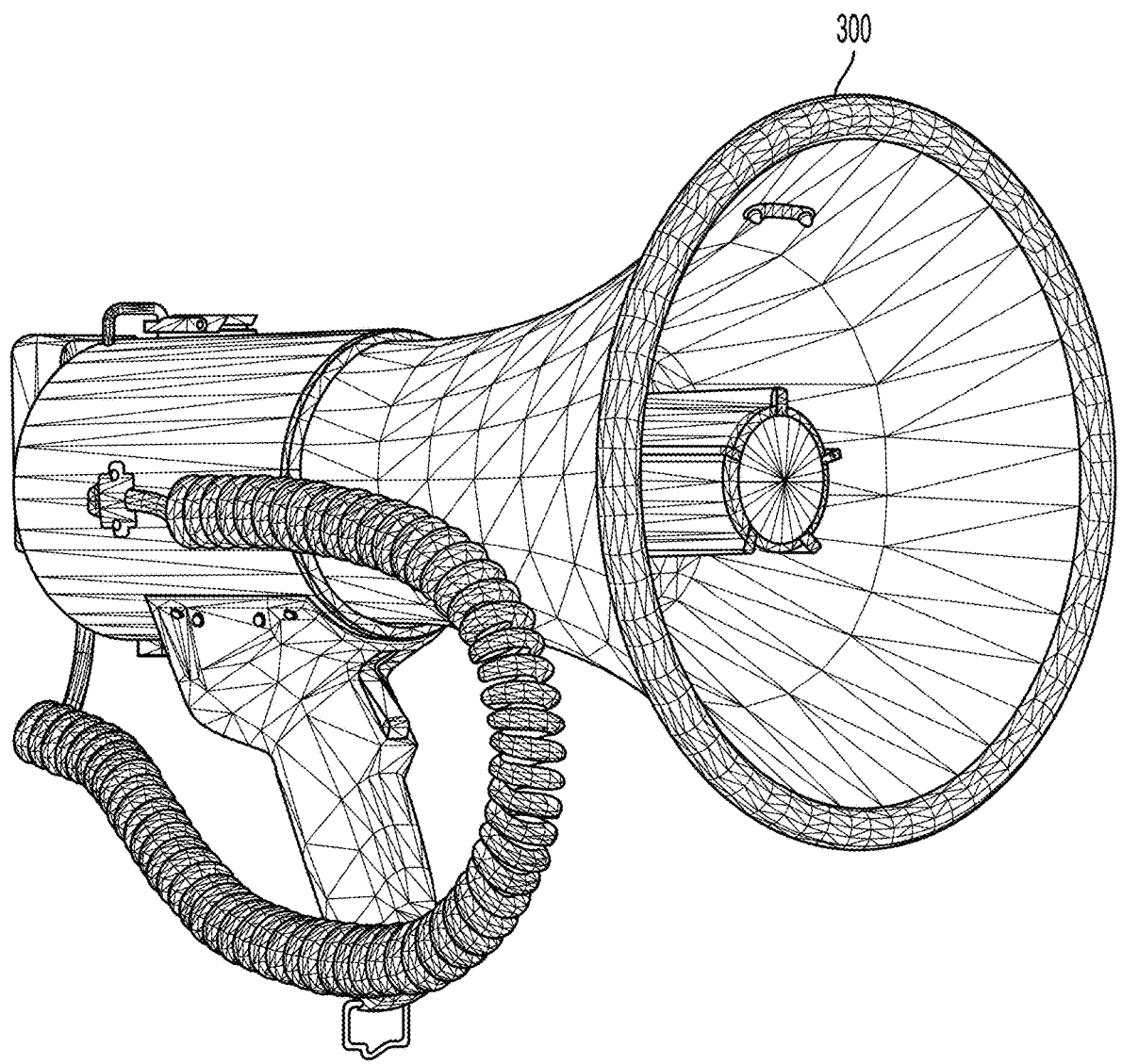
FIG. 3 shows an example 3D mesh, according to certain embodiments of this disclosure.

As discussed above with respect to block 215, and as described further below, an embodiment of the mesh-segmentation system 100 detects elongated shapes among the segments of a mesh and further subdivides a segment deemed to be an elongated shape. FIG. 3 illustrates an example mesh 300, according to some embodiments. As shown in FIG. 3, the mesh 300 is a set of polygons, specifically triangles in this case, forming the surface of an object. Thus, the mesh 300 is a 3D model of the object and represents the object. The examples of FIGS. 4-7 illustrate certain benefits of the mesh-segmentation system 100.

Figure 4:
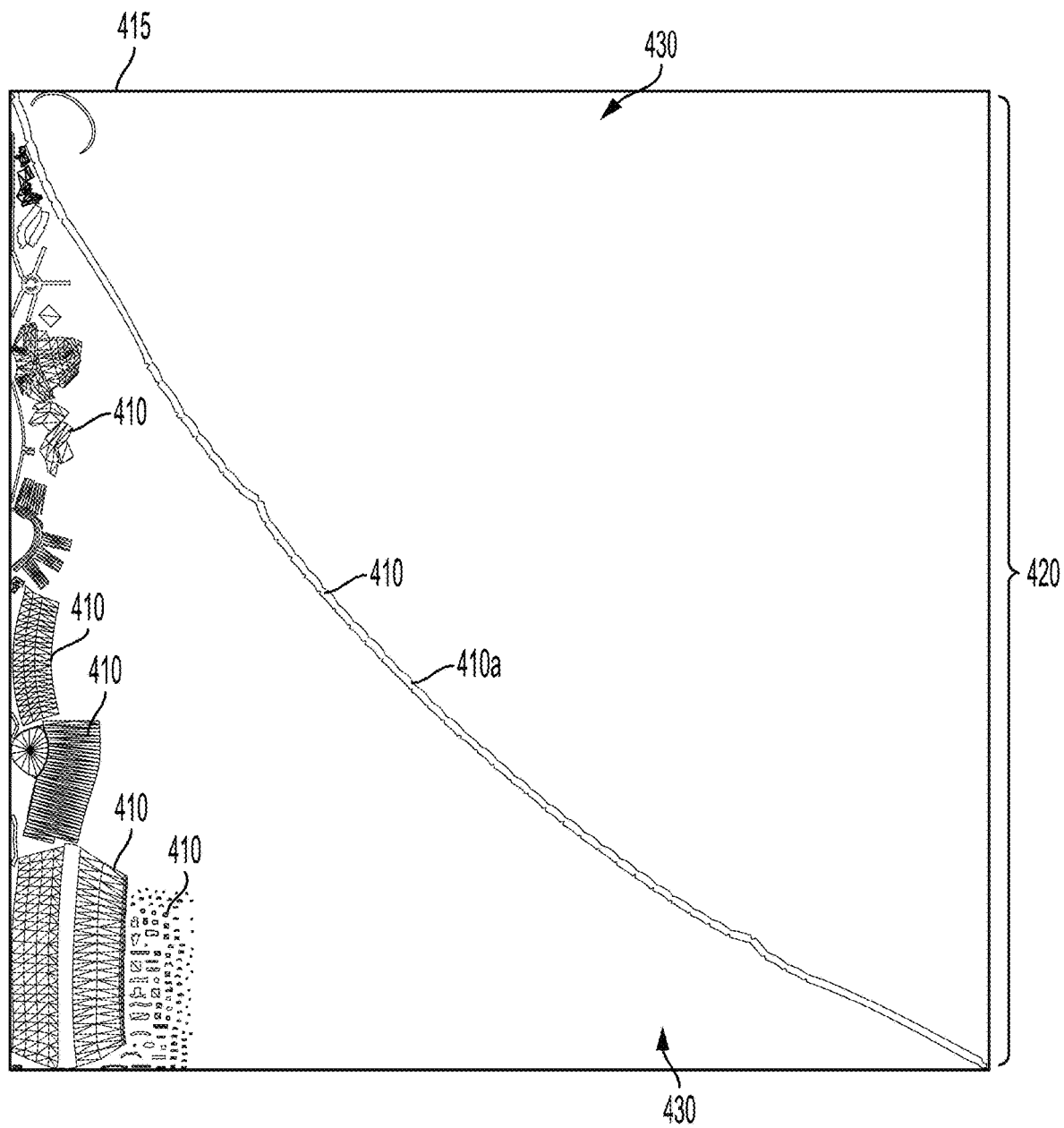
FIG. 4 shows an example of packing flattened segments of a 3D mesh into a two-dimensional (2D) area without execution of the mesh-segmentation system, according to some embodiments of this disclosure.

FIG. 4 shows an example of packing flattened segments 410 of a mesh 300 into a 2D area 415 to create a texture map 420, according to some embodiments of this disclosure. Specifically, this is an example of packing without the mesh-segmentation system 100 being used. As shown in this example, the various segments 410 are sized to fit into the 2D area 415. Because a first segment 410a is an elongated shape, however, all the segments had to be sized to a relatively small scale to enable the first segment to fit in the 2D area 415. As a result, the wasted space 430 is a large percentage of the 2D area 415.

Figure 5:
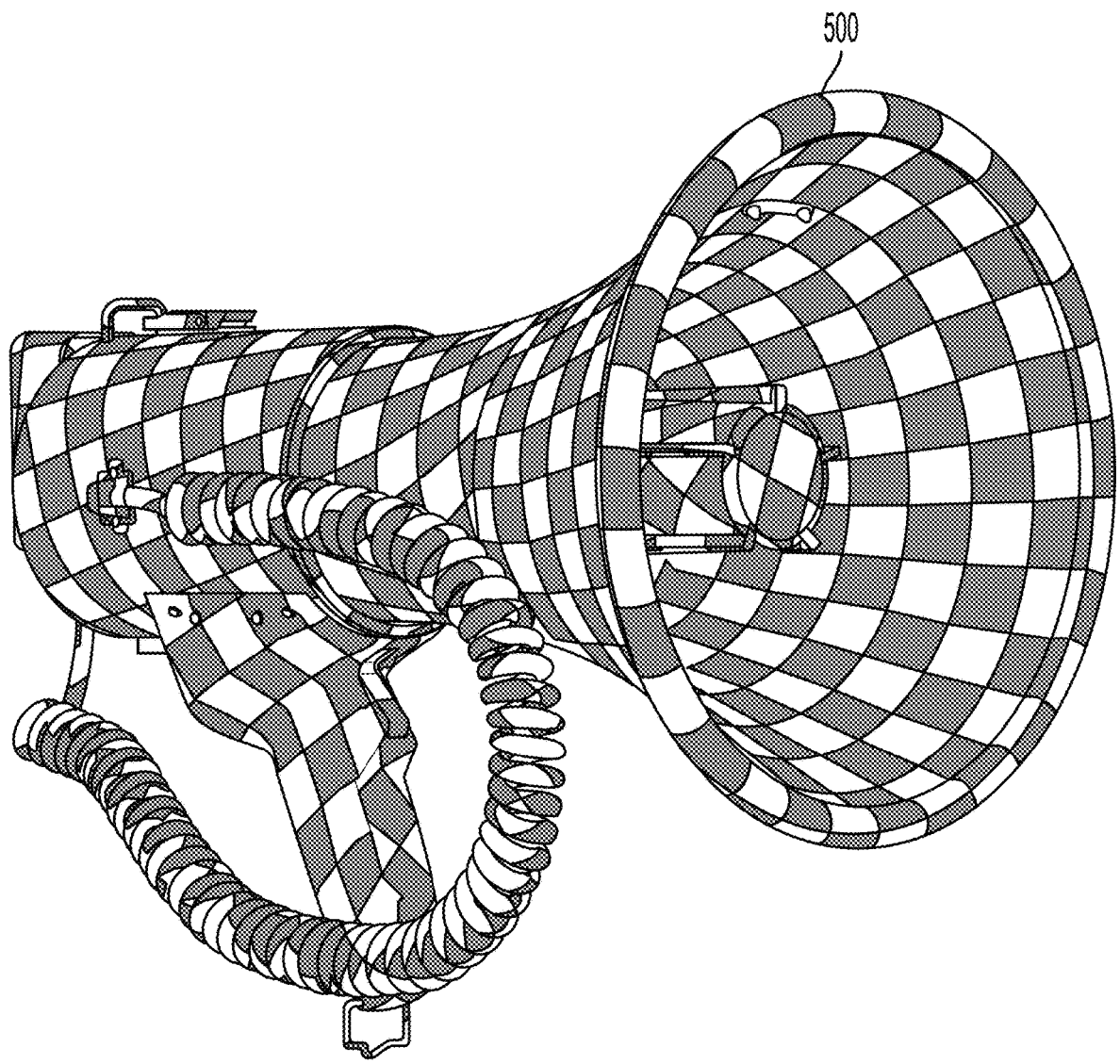
FIG. 5 shows an example of a resulting textured 3D mesh without execution of the mesh-segmentation system, according to some embodiments of this disclosure.

FIG. 5 shows an example of a resulting textured object 500 without execution of the mesh-segmentation system 100, according to some embodiments of this disclosure. Specifically, FIG. 5 continues the example of FIG. 4 by illustrating the textured object 500 created by applying the texture map 420 resulting from the packing shown in FIG. 4. As shown, the textured object 500 has a relatively low texel density due to the segments having been sized at a relatively small scale within the texture map 420.

Figure 6:
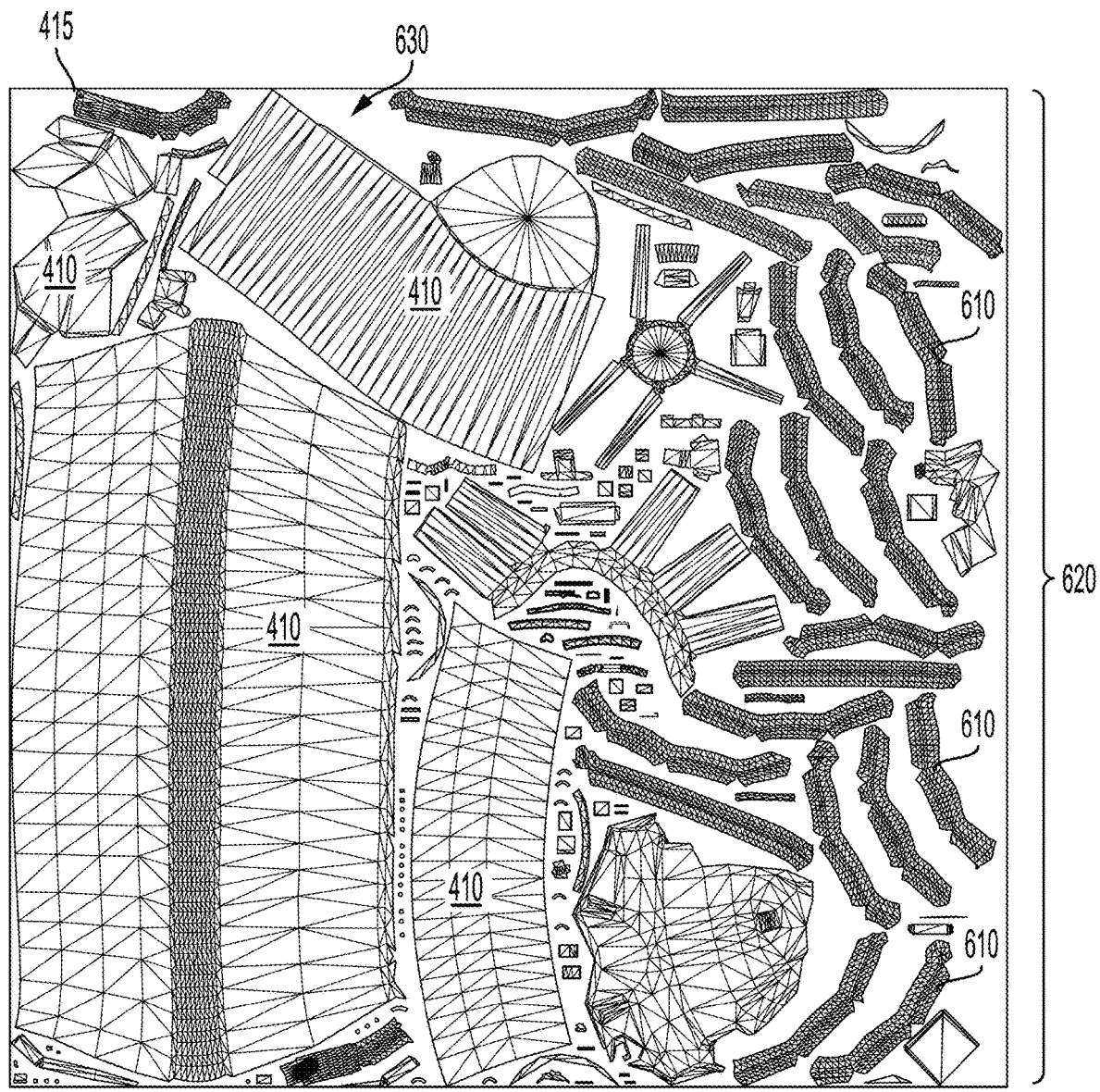
FIG. 6 shows an example of packing flattened segments of a 3D mesh into a 2D area after execution of the mesh-segmentation system, according to some embodiments of this disclosure.

FIG. 6 shows another example of packing flattened segments 410 of a mesh 300 into a 2D area 415 to create a texture map 620, according to some embodiments of this disclosure. Specifically, in this example, the same mesh 300 is being textured as in FIGS. 4-5, and the original segments 410 (e.g., as determined by the charting system 110) are the same, including a first segment 410a that is an elongated shape. However, this packing operation occurs after execution of the mesh-segmentation system 100. The mesh-segmentation system 100 divided the first segment 410a into sub-segments 610 and replaced the first segment 410a with the sub-segments 610. As shown in FIG. 6, the various segments 410, including the sub-segments 610 rather than the first segment 410a, are sized to fit into the 2D area 415. In this example, due to removal of the elongated shape, the segments are sized at a larger scale than in the example of FIG. 4, and as a result, the amount of wasted space 630 is a reduced.

Figure 7:
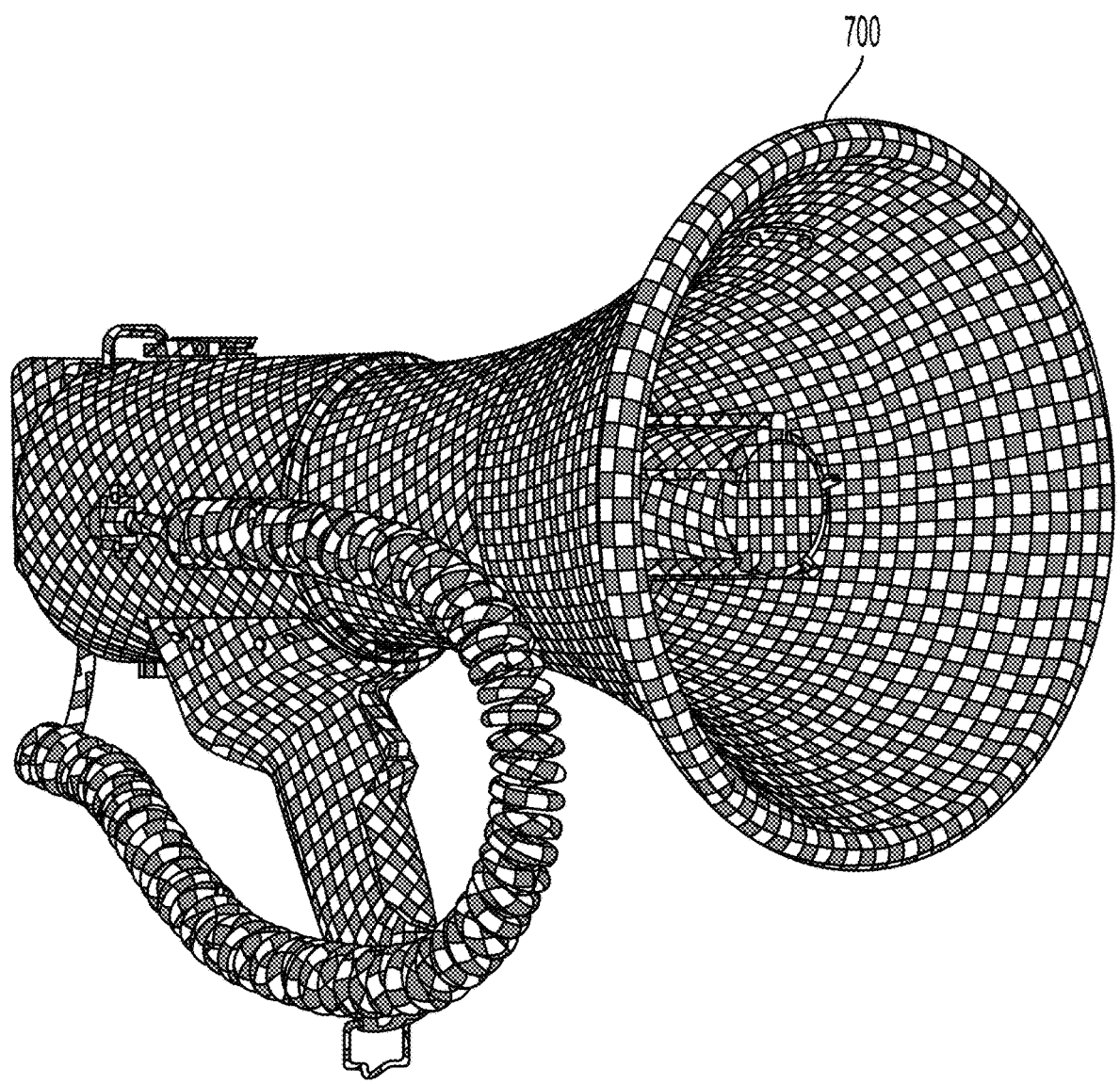
FIG. 7 shows an example of a resulting textured 3D mesh after execution of the mesh-segmentation system, according to some embodiments of this disclosure.

FIG. 7 shows an example of a resulting textured object 700 after execution of the mesh-segmentation system 100, according to some embodiments of this disclosure. Specifically, FIG. 7 continues the example of FIG. 6 by illustrating the textured object 700 created by applying the texture map 620 resulting from the packing shown in FIG. 6. As shown, the textured object 700 has a higher texel density than the textured object 500 of FIG. 5, due to the segments 410 having been sized at a larger scale within the texture map 620.

Figure 8:
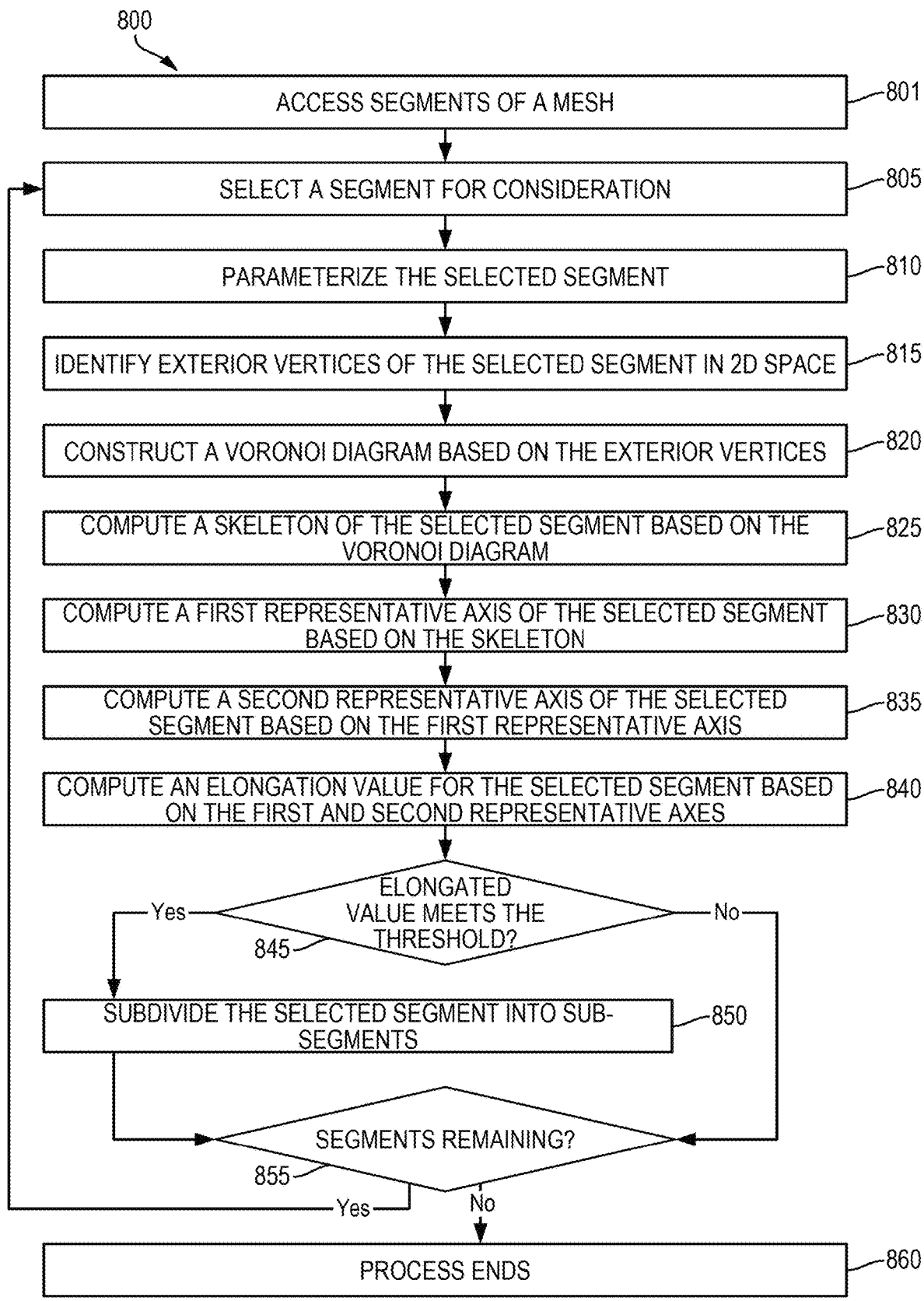
FIG. 8 shows an example of a process of identifying elongated shapes in segments of the 3D mesh, according to some embodiments of this disclosure.

FIG. 8 shows an example of a process 800 of identifying elongated shapes in segments 410 of a mesh 300, according to some embodiments of this disclosure. An embodiment of the mesh-segmentation system 100 executes this process 800 or similar to determine which, if any, segments 410 are elongated shapes. For instance, the mesh-segmentation system 100 executed the process 800 or similar at block 215 of the above process 200 for texturing an object. The process 800 depicted in FIG. 8 may be implemented in software (e.g., code, instructions, program) executed by one or more processing units of the computer system, implemented in hardware, or implemented in a combination of software and hardware. The process 800 presented in FIG. 8 and described below is intended to be illustrative and non-limiting. Although FIG. 8 depicts various processing operations occurring in a particular sequence or order, this is not intended to be limiting. In certain alternative embodiments, the processing may be performed in a different order or some operations may also be performed in parallel.

As shown in FIG. 8, at block 801, the process 800 involves accessing segments 410 of a mesh 300. Block 805 begins an iterative loop in which a respective segment is considered during each iteration. At block 805, the process 800 involves selecting for consideration one of the segments accessed at block 801. At block 810, the process 800 involves parameterizing the selected segment 410, which was selected at block 805, to form a flattened version (i.e., an island) of the selected segment 410.

At block 815, the process 800 involves identifying exterior vertices of the selected segment 410 in two-dimensional space. In some embodiments, the exterior vertices are those defining the outline of the segment, such that interior vertices defining holes inside the segment are excluded. Various techniques can be used to identify the exterior vertices. In one example, to identify the exterior vertices, the mesh-segmentation system 100 accesses the selected segment 410 (i.e., a chart) and its parameterization (i.e., the corresponding island) determined at block 810. Because the parameterization is bijective, the vertices having extremal values (i.e., the minimum or maximum value for each of the two dimension) are guaranteed to lie on the external boundary and thus to be exterior vertices. Thus, an embodiment of the mesh segmentation system 100 identifies a first vertex having the highest or lowest coordinate value in either dimension. This vertex is an exterior vertex. From the first vertex, the mesh-segmentation system 100 expands along the loop of edges to identify the boundary (i.e., the exterior vertices), by following a path from each vertex to an adjacent exterior vertex. This process of expansion is possible due to topological connectivity information stored about the selected segment 410. For example, some embodiments use a graph-based approach for storing information about the mesh 300 and the segments 410; the nodes of the graph could be references to the topological entities, such as the vertices, and three-dimensional coordinates, parameterized coordinates, or other data are stored in each node for the corresponding topological entity. Using this expansion technique, the process of identifying the exterior vertices is thus a linear-time operation in some embodiments.

Figure 9:
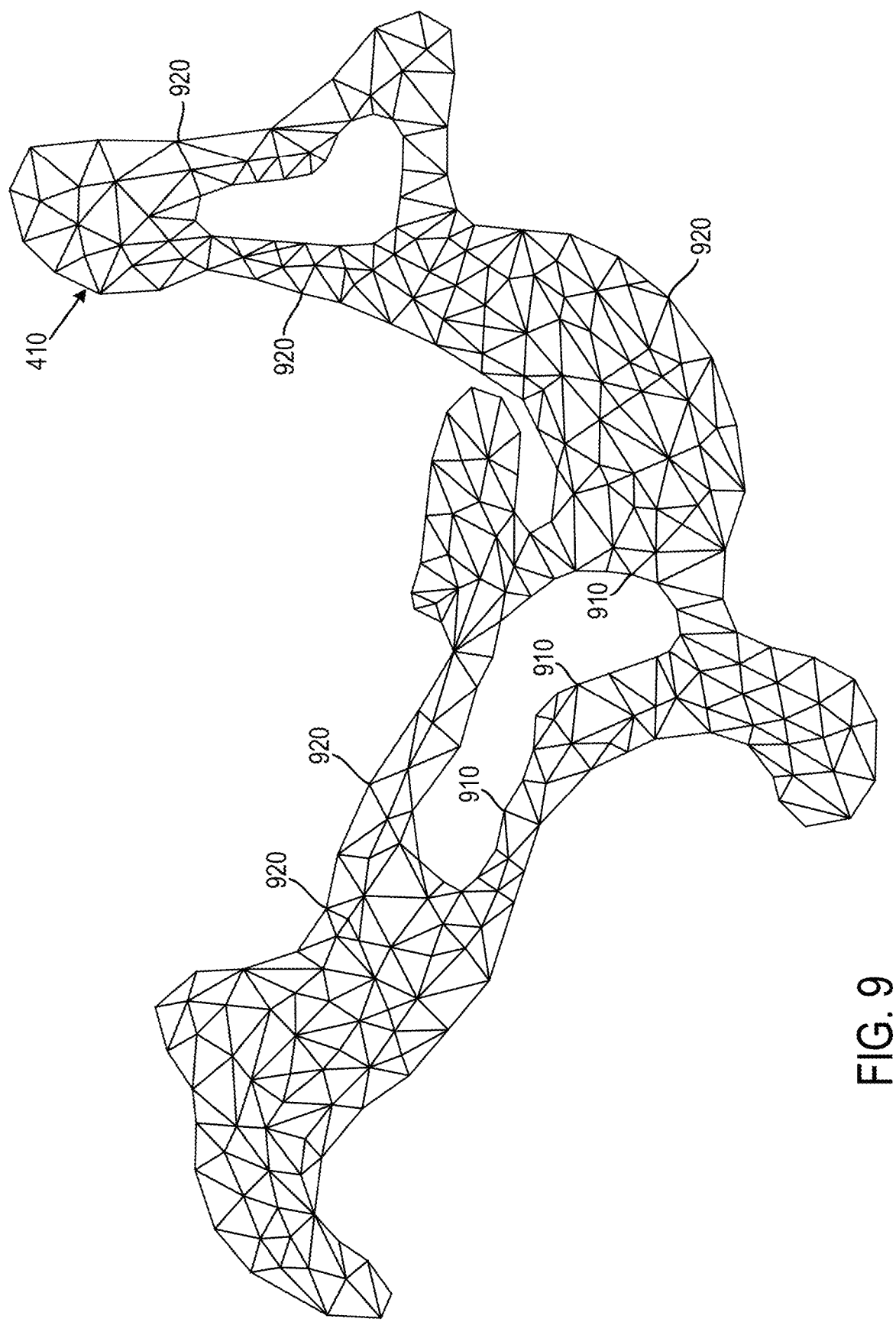
FIG. 9 shows an example of a segment having interior vertices and exterior vertices, according to certain embodiments of this disclosure.

FIG. 9 shows an example of a segment 410 with interior vertices 910 and exterior vertices 920, according to some embodiments of this disclosure. For the remainder of this iteration of the loop, an example of the mesh-segmentation system 100 considers only the exterior vertices 920 while ignoring the interior vertices 910.

Figure 10:
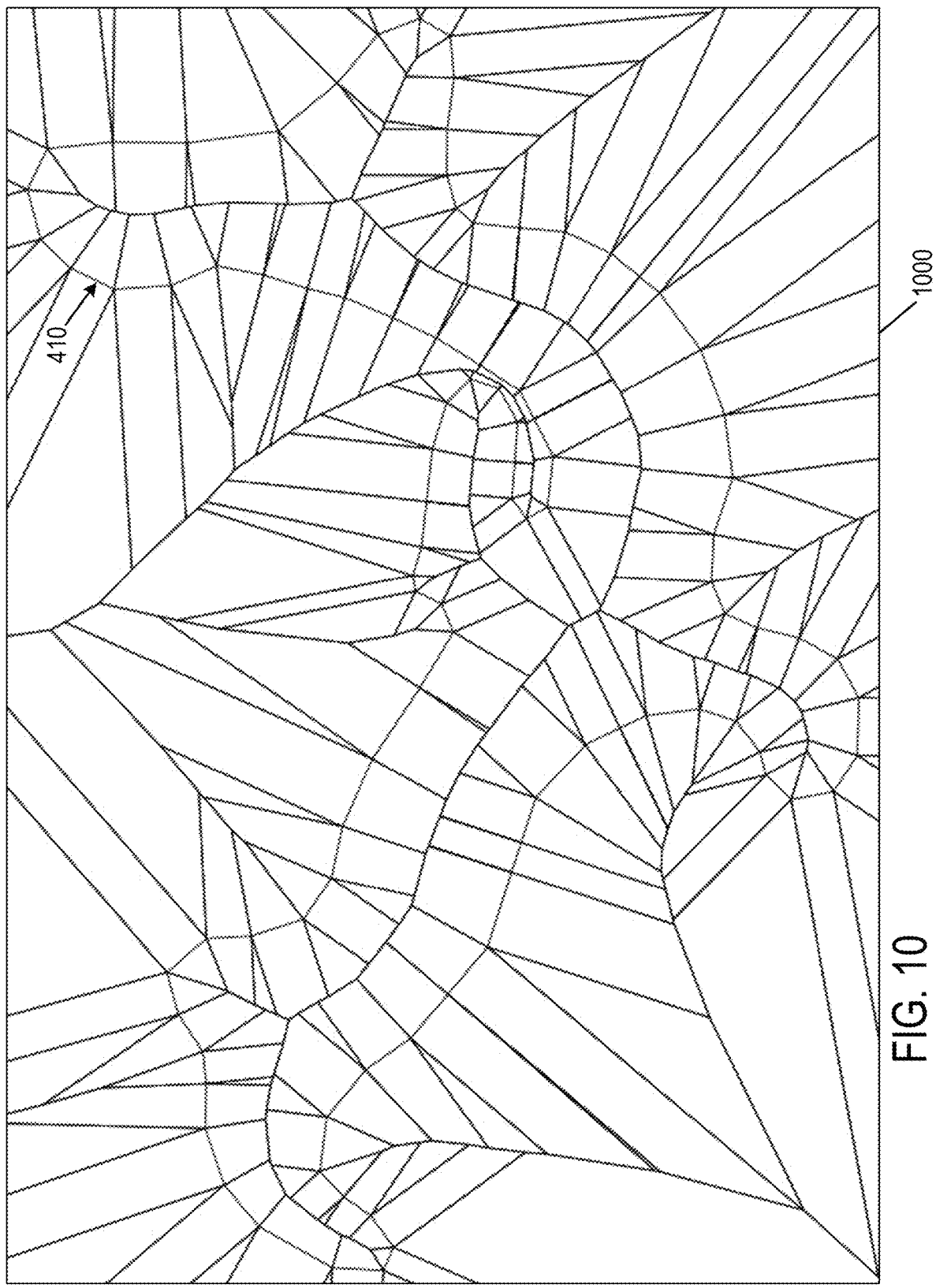
FIG. 10 shows an example of a Voronoi diagram based on the exterior vertices of the segment shown in the example of FIG. 9, according to some embodiments of this disclosure.

At block 820 of FIG. 8, the process 800 involves constructing a Voronoi diagram for the selected segment 410 based on the exterior vertices 920 identified at block 815. Generally, a Voronoi diagram is a particular portioning of a plane that utilizes a set of primitives, such as vertices or line segments; in this example process 800, the line segments on which the Voronoi diagram is based are the exterior line segments connecting the exterior vertices 920 of the selected segment 410, as flattened. FIG. 10 shows an example of a Voronoi diagram 1000 based on these exterior line segments of the selected segment 410 shown in the example of FIG. 9, according to some embodiments of this disclosure.

Figure 11:
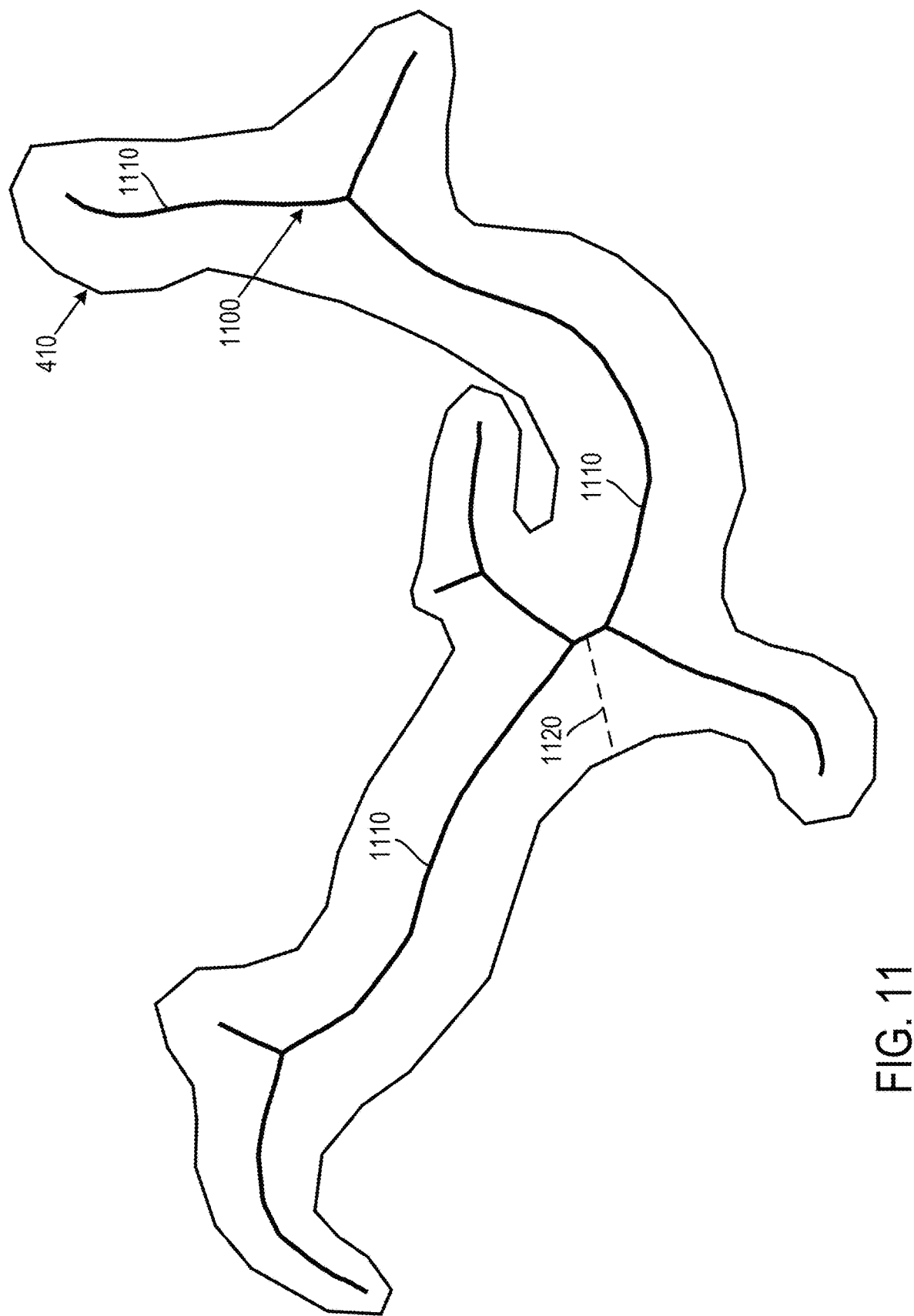
FIG. 11 shows an example of a skeleton of the segment illustrated in the example of FIG. 9, according to certain embodiments of this disclosure.

At block 825 of FIG. 8, the process 800 involves computing a skeleton of the flattened version of the selected segment 410 based on the Voronoi diagram 1000. In some embodiments, the skeleton is two-dimensional. For instance, the skeleton is the medial axis transform of the Voronoi diagram. To determine the medial axis transform, to be used as the skeleton, an embodiment of the mesh-segmentation system extracts the edges (i.e., line segments) of the Voronoi diagram that are fully contained within the boundary of the selected segment 410, as flattened, such as by discarding edges that are adjacent to or outside of the boundary. The extracted, or remaining, edges together form the medial axis transform, which the mesh-segmentation system 100 can use as a skeleton of the selected segment 410. FIG. 11 shows an example of a skeleton 1100 of the segment 410 in the example of FIG. 9, specifically in the case where the skeleton 1100 is the medial axis transform of the Voronoi diagram 1000.

At block 830 of FIG. 8, the process 800 involves computing a first representative axis of the selected segment 410. Generally, the first representative axis represents a first dimension (e.g., length) of the flattened version of selected segment 410. In some embodiments, the mesh-segmentation system 100 determines the longest path within the skeleton 1100 in parameterized space (e.g., using the 2D coordinates determined for vertices of the selected segment 410 by the parameterization system 120) and uses that longest path as the first representative axis. To this end, an embodiment of the mesh-segmentation system 100 solves the longest path problem. For instance, the mesh-segmentation problem 100 selects a first vertex in the skeleton 1100 arbitrarily, finds a second vertex that is farthest away along the skeleton 1100, finds a third vertex that is farthest away from the second vertex along the skeleton 1100, and deems the path from the second vertex to the third vertex to be the longest path and, thus, the first representative axis. In additional or alternative embodiments, the mesh-segmentation system 100 uses a brute-force technique by computing the length of each path in the skeleton, comparing the lengths of such paths to one another to determine the longest one, and selecting the longest as the first representative axis. However, this latter technique is typically not computationally efficient.

At block 835, the process 800 involves computing a second representative axis of the selected segment 410. The second representative axis may be a path that is adjacent to (e.g., intersects or crosses) the first representative axis. An example of the second representative axis includes one or more edges selected from the Voronoi diagram 1000. Specifically, in some embodiments, the mesh-segmentation system 100 determines, in the Voronoi diagram 1000, a new longest edge that extends from the first representative axis to the boundary of the selected segment 410. The mesh-segmentation system 100 then uses the new longest edge as the second representative axis.

Referring back to the example of FIG. 11, as shown, a first representative axis 1110 represents a first dimension of the selected segment 410. A second representative axis 1120 shown as a dashed line represents a second dimension of the selected segment 410. In this example the second representative axis 1120 is not part of the skeleton 1100 although the second representative axis 1120 is an edge in the Voronoi diagram 1000, but in an alternative example, the second representative axis 1120 could be part of the skeleton 1100. In some embodiments, as in the example shown, each of the first representative axis 1110 and the second representative axis 1120 need not be a single straight line and need not align with a horizontal or vertical axis.

Although blocks 820-835 of FIG. 8 describe determining the first representative axis 1110 and the second representative axis 1120 by determining the Voronoi diagram 1000, these operations are described for illustrative purposes only and do not limit the scope of this disclosure. For instance, in another example, the mesh-segmentation system 100 could determine the first representative axis 1110 by connecting two exterior vertices 920 that are farthest apart from one another, and the second representative axis could be a line or curve connecting exterior vertices 920 on opposite sides of the first representative axis 1110. Various techniques could be used to determine the first representative axis 1110 and the second representative axis 1120 for the selected segment 410.

As shown in FIG. 8, at block 840, the process 800 involves computing an elongation value for the selected segment 410, based on the first representative axis 1110 and the second representative axis 1120 determined at block 830-835. In some embodiments, the elongation value describes a degree of elongation of the selected segment 410. In one example, the mesh-segmentation system 100 computes the elongation value as the ratio of the length of the first representative axis 1110 (e.g., in parameterized space) to the length of the second representative axis 1120 (e.g., in parameterized space). In embodiments, a larger elongation value indicates a greater degree of elongation while a smaller elongation value indicates a lesser degree of elongation. In alternative embodiments, however, a smaller elongation value may indicate a larger degree of elongation, depending on how the elongation value is computed.

At decision block 845, the process 800 involves comparing the elongation value of the selected segment, as determined at block 840, to a threshold elongation value to determine whether the elongation value meets the threshold elongation value. In some embodiments, the threshold elongation value is static, in which case a user may define the threshold elongation value or the threshold elongation value may have a default value. In some other embodiments, however, the mesh-segmentation system 100 dynamically sets the threshold elongation value, such as based on the various elongation values of the segments 410 of the mesh 300 as determined by the charting system 110. If the elongation value of the selected segment 410 meets the threshold elongation value (e.g., exceeds the threshold in the case where a higher elongation value indicates a larger degree of elongation), then the mesh-segmentation system 100 deems the selected segment 410 to be elongated (i.e., an elongated shape). In that case, the process 800 continues to block 850. However, if the elongation value does not meet the threshold elongation value, then the mesh-segmentation system 100 deems the selected segment 410 not to be elongated (i.e., not an elongated shape), and in that case, the process 800 skips to decision block 855.

At block 850, the selected segment 410 is an elongated shape, and the process 800 involves subdividing the selected segment 410 into two or more sub-segments. Example operations for subdividing a segment 410 deemed to be an elongated shape are described in detail below with reference to FIG. 12. The process 800 then proceeds to decision block 855.

At decision block 855, the process 800 involves determining whether any segments 410 of the mesh 300 remain to be considered. If at least one or more segment 410 remains to be considered, the process returns to block 805 to select another segment 410 for consideration. Otherwise, the process 800 ends at block 860, with all segments 410 that are elongated shapes having been replaced by sub-segments.

Figure 12:
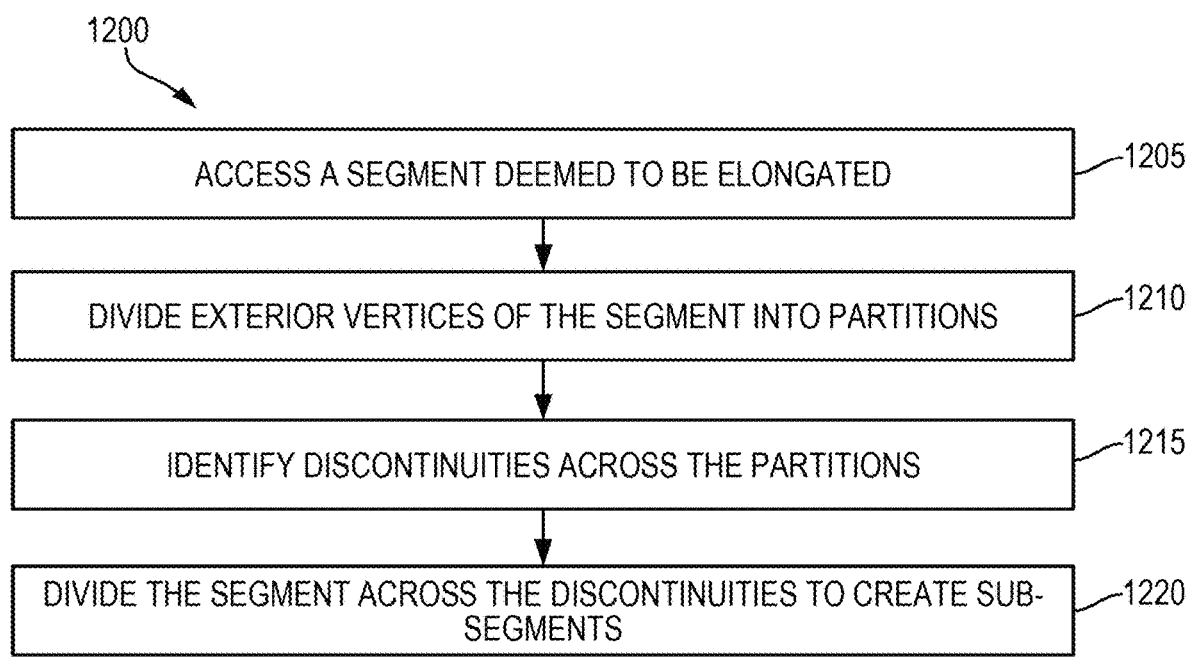
FIG. 12 shows an example of a process of further subdividing a segment deemed to be an elongated shape, according to some embodiments of this disclosure.

FIG. 12 shows an example of a process 1200 of further segmenting, or subdividing, a segment 410 deemed to be an elongated shape, according to some embodiments of this disclosure. An embodiment of the mesh-segmentation system 100 executes this process 1200 or similar at block 850 of the above process 800 to split a segment 410 deemed to be an elongated shape. In some embodiments, at the completion of all iterations of the loop in the above process 800 of FIG. 8, the mesh-segmentation system 100 has initiated this process 1200 of FIG. 12 to subdivide each segment 410 deemed to an elongated shape.

The process 1200 depicted in FIG. 12 may be implemented in software (e.g., code, instructions, program) executed by one or more processing units of the computer system, implemented in hardware, or implemented in a combination of software and hardware. The process 1200 presented in FIG. 12 and described below is intended to be illustrative and non-limiting. Although FIG. 12 depicts various processing operations occurring in a particular sequence or order, this is not intended to be limiting. In certain alternative embodiments, the processing may be performed in a different order or some operations may also be performed in parallel.

As shown in FIG. 12, at block 1205, the process 1200 involves accessing a segment 410. For instance, the segment 410 and considered in this process 1200 is a segment 410 deemed to be an elongated shape as described above.

At block 1210, the process 1200 involves dividing the exterior vertices 920 of the segment into a quantity of partitions. In some embodiments, the quantity of partitions is dependent on a comparison of the elongation value of the segment 410 to the threshold elongation value. Specifically, in one example, the mesh-segmentation system 100 partitions the exterior vertices 920 into a quantity of groups, such that the quantity is the ceiling of the elongation value divided by the threshold elongation value. As such, sub-segments 610 based on such partitions are not likely to be elongated shapes.

Various techniques may be used to partition the exterior vertices 920. In some embodiments, the mesh-segmentation system 100 identifies a root vertex, which could be the exterior vertex 920 closest to one end of the first representative axis 1110. The mesh-segmentation system 100 then assigns each exterior vertex 920 to a partition based on that exterior vertex's distance from the root vertex. An example of the mesh-segmentation system 100 determines the quantity of partitions (e.g., as the ceiling of the elongation value divided by the threshold elongation value) and then divides the length of the first representative axis 1110 by that quantity to determine a chart length. The mesh-segmentation system 100 then assigns each exterior vertex 920 to a partition based on the number of chart lengths that fit on a respective path between that exterior vertex 920 and the root vertex. For instance, exterior vertices 920 within one chart length of the root vertex are assigned to a first partition, exterior vertices 920 between one and two chart lengths of the root vertex are assigned to a second partition, exterior vertices 920 between two and three chart lengths of the root vertex are assigned to a third partition, and so on until each exterior vertex 920 has been assigned to a partition.

Figure 13:
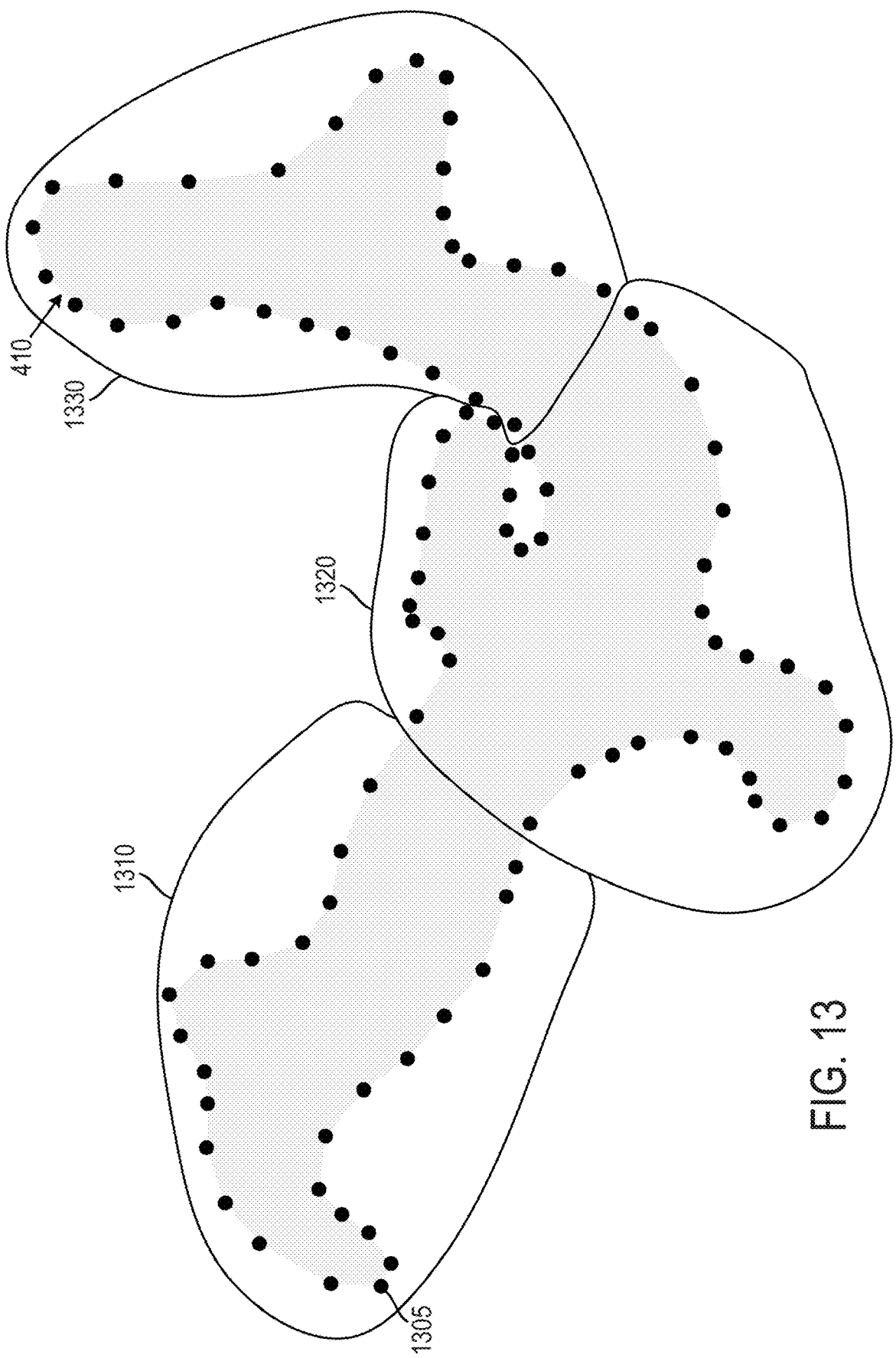
FIG. 13 shows an example of the segment illustrated in the example of FIG. 9, with the exterior vertices having been partitioned, according to certain embodiments of this disclosure.

FIG. 13 shows an example of a segment 410, specifically the segment in the example of FIG. 9, with the exterior vertices 920 having been partitioned, according to some embodiments of this disclosure. In this example, the elongation value of the segment 410 is 14.45, and the threshold elongation value is 6, giving a quantity of partitions equal to $\lceil 14.45/5 \rceil = 3$. As such, the partitions of exterior vertices 920 include a first partition 1310, a second partition 1320, and a third partition 1330. Each exterior vertex 920 is assigned to a partition based on the path length along the first representative axis 110 between the exterior vertex 920 and a root vertex 1305.

At block 1215 of FIG. 12, the process 1200 involves identifying discontinuities across the partitions determined at block 1210. In some embodiments, a discontinuity is a pair of edges connecting exterior vertices 920 of the segment 410, where each such edge crosses from a first partition into a second partition. Thus, a discontinuity spans two partitions in particular To identify the discontinuities, an embodiment of the mesh-segmentation system 100 steps around the boundary of the segment 410 by following the edges from each exterior vertex 920 to the next, while marking as part of a discontinuity each edge between adjacent exterior vertices 920 in different partitions. The mesh-segmentations system 100 then pairs edges crossing between the same two partitions, and such pairs are deemed discontinuities. In some embodiments, each discontinuity includes an edge on each side of the first representative axis 1110.

At block 1220, the process 1200 involves dividing the segment across the discontinuities. In some embodiments, to this end, the mesh-segmentation system 100 considers the closed loop made by the exterior vertices 920 of the segment 410. Thus, when maintaining topological information in a graph, as discussed above, the graph considered for determining how to partition the segment 410 is a sub-graph of the full graph, including only nodes corresponding to exterior vertices 920 rather than all vertices. Given a discontinuity including two edges, the mesh-segmentation system 100 selects a path, such as the shortest path, in parameterized (i.e., 2D) space between a first vertex from one such edge and a second vertex of another such edge. This mesh-segmentation system 100 then cuts the segment 410 across this selected path. By cutting the segment in two dimensions, the mesh-segmentation system 100 also cuts the segment in three dimensions along that same path between the corresponding exterior vertices 920 in three dimensions. In doing so, the mesh-segmentation system 100 further subdivides the segment 410 to create sub-segments 610.

Figure 14:
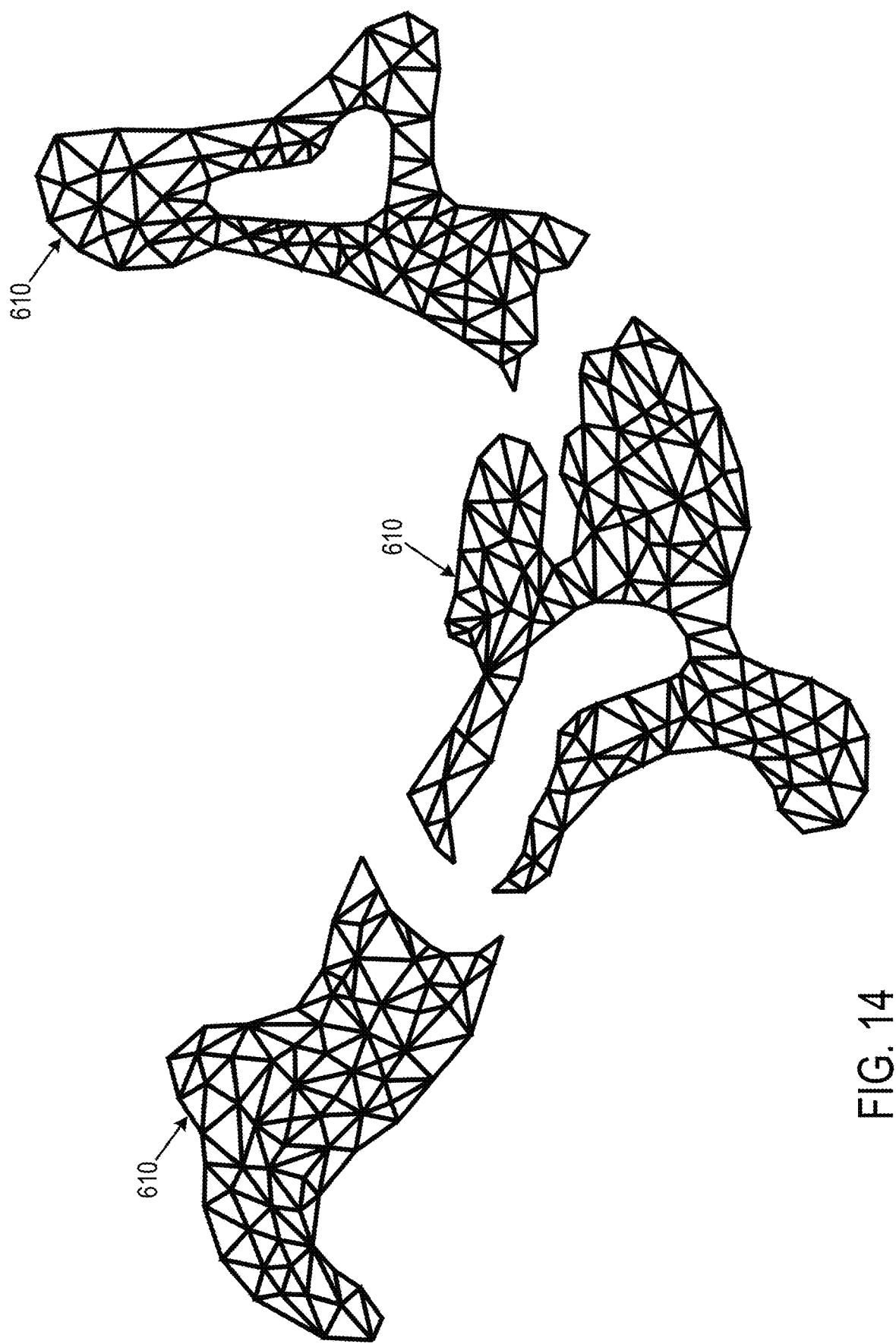
FIG. 14 shows an example of subdividing the segment initially illustrated in the example of FIG. 9, according to certain embodiments of this disclosure.

FIG. 14 shows an example of subdividing the segment 410 initially illustrated in the example of FIG. 9, according to some embodiments of this disclosure. As discussed above, the segment 410 is subdivided into three sub-segments 610, with each sub-segment corresponding to a partition of exterior vertices 920. As illustrated in FIG. 14, although holes defined by interior vertices 910 have been ignored in some embodiments, the interior vertices 910 may still be incorporated into the sub-segments 610.

At block 1220 of FIG. 12, the process 1200 involves replacing the segment 410 with the sub-segments 610 determined at block 1215, such that the packing operation is performed with the sub-segments 610 rather than with the full segment 410.

As described above, by subdividing each segment 410 deemed to be an elongated shape, the mesh-segmentation system 100 can reduce the amount of wasted space from eventually packing the flattened segments into the 2D area. This can increase texel density in the final textured object. In some embodiments, the mesh segmentation system 100 additionally checks each sub-segment 610 to determine whether that sub-segment 610 is also an elongated shape and, if so, further subdivides the sub-segment 610. However, it may be the case that the qualitative impact of checking sub-segments 610 for elongation and further subdividing them is not worthwhile compared to the additional computations required.

Figure 15:
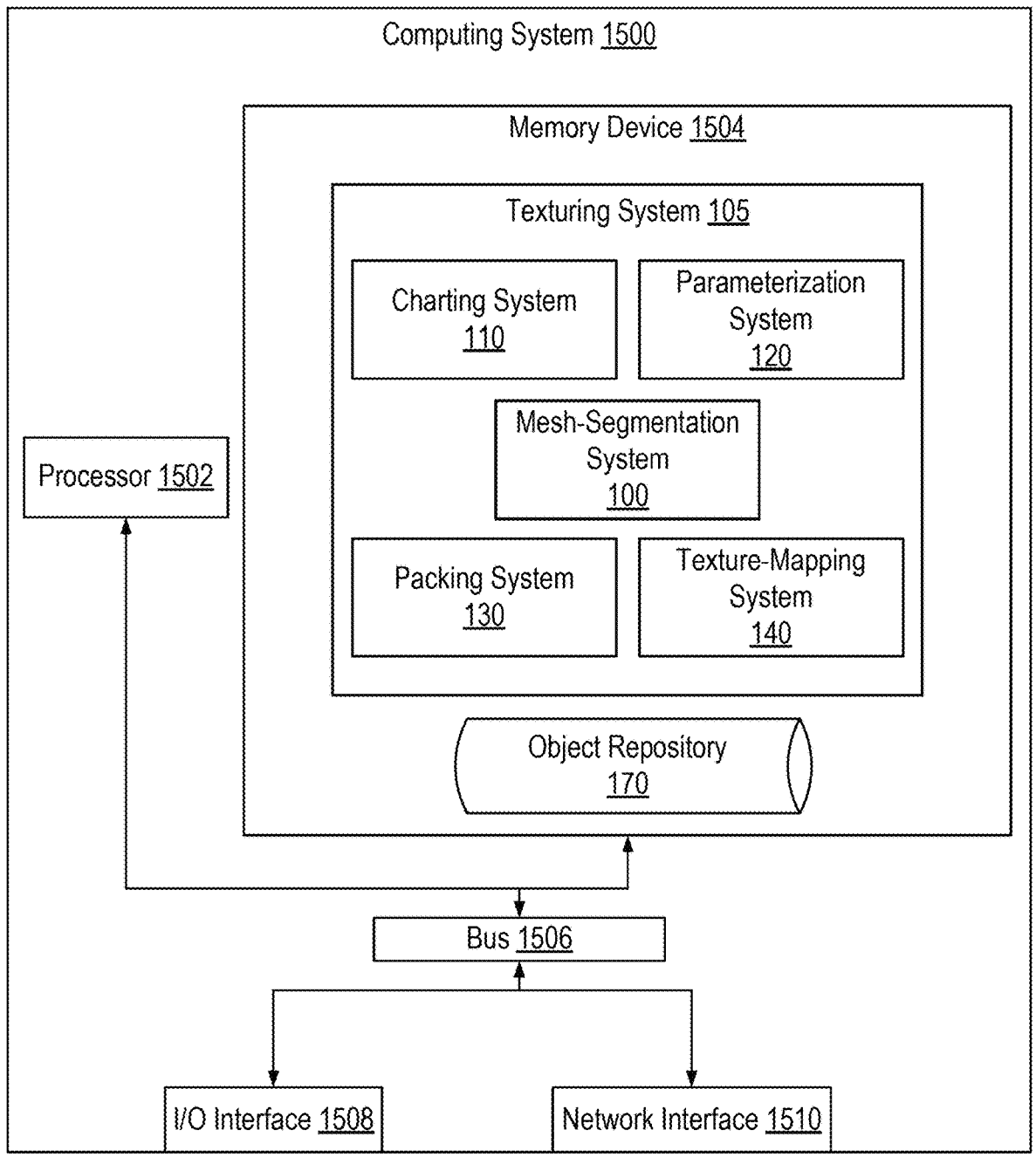
FIG. 15 shows an example of a computing system that performs certain operations described herein, according to certain embodiments of the present disclosure.

FIG. 15 shows an example of a computing system 1500 that performs certain operations described herein, according to certain embodiments of the present disclosure. The computing system 150 of FIG. 1 may be the same or similar to the computing system 1500 depicted in FIG. 15. Any suitable computing system or group of computing systems can be used for performing the operations described herein. For example, FIG. 15 depicts an example of computing system 1500 that executes a texturing system 105, including a mesh-segmentation system 100. In some embodiments, however, a separate computing system having devices similar to those depicted in FIG. 15 (e.g., a processor, a memory, etc.) executes certain other aspects of the texturing system 105.

The depicted example of a computing system 1500 includes a processor 1502 communicatively coupled to one or more memory devices 1504. The processor 1502 executes computer-executable program code stored in a memory device 1504, accesses information stored in the memory device 1504, or both. Examples of the processor 1502 include a microprocessor, an application-specific integrated circuit (ASIC), a field-programmable gate array (FPGA), or any other suitable processing device. The processor 1502 can include any number of processing devices, including a single processing device.

The memory device 1504 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 1500 may also include a number of external or internal devices, such as input or output devices. For example, the computing system 1500 is shown with one or more input/output ("I/O") interfaces 1508. An I/O interface 1508 can receive input from input devices or provide output to output devices. One or more buses 1506 are also included in the computing system 1500. The bus 1506 communicatively couples one or more components of a respective one of the computing system 1500.

The computing system 1500 executes program code that configures the processor 1502 to perform one or more of the operations described herein. The program code includes, for example, the mesh-segmentation system 100 and potentially other aspects of the texturing system 105. The program code may be resident in the memory device 1504 or any suitable computer-readable medium and may be executed by the processor 1502 or any other suitable processor. In some embodiments, the mesh-segmentation system 100 and other aspects of the texturing system 105 are stored in the memory device 1504, as depicted in FIG. 15. In additional or alternative embodiments, certain other aspects of the texturing system 105 are stored in different memory devices of different computing systems. In additional or alternative embodiments, the program code described above is stored in one or more other memory devices accessible via a data network.

The computing system 1500 can access the object repository 170 in any suitable manner. In some embodiments, the object repository 170 is stored in the memory device 1504, as in the example depicted in FIG. 15. For another example, the object repository 170 is stored remotely and is accessible by the computing system 1500 via a data network.

The computing system 1500 also includes a network interface device 1510. The network interface device 1510 includes any device or group of devices suitable for establishing a wired or wireless data connection to one or more data networks. Non-limiting examples of the network interface device 1510 include an Ethernet network adapter, a modem, and the like. The computing system 1500 is able to communicate with one or more other computing devices (e.g., a computing device executing other aspects of the texturing system 105) via a data network using the network interface device 1510.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method in which one or more processing devices perform operations comprising:
    accessing segments of a three-dimensional (3D) mesh;
    detecting that a first segment of the segments is elongated, comprising:
        assigning, for each vertex of 3D vertices of the first segment, respective initial 2D coordinates;
        computing a first representative axis of the first segment using the respective initial 2D coordinates of the 3D vertices of the first segment, wherein the first representative axis represents a first dimension of the first segment, comprising:
            determining a plane-portioned representation of the first segment; and
            determining a skeletonized representation of the first segment based on the plane-portioned representation, wherein a longest path in the skeletonized representation is used as the first representative axis;
        computing a second representative axis of the first segment using the initial 2D coordinates, wherein the second representative axis represents a second dimension of the first segment, comprising determining a longest edge in the plane-portioned representation extending from the first representative axis to a boundary of the first segment; and
        computing an elongation value based on a first path length of the first representative axis and a second path length of the second representative axis; and
        determining that the elongation value meets a threshold elongation value;
    modifying the segments of the 3D mesh by subdividing the first segment into two or more sub-segments of the 3D mesh, based on the first segment being elongated, comprising:
        computing a chart length by dividing the first path length of the first representative axis by a number of sub-segments in the two or more sub-segments; and
        partitioning vertices of the first segment, wherein the partitioning comprises assigning a first vertex of the first segment to a first partition based how many chart lengths fit in a distance between the first vertex and a root vertex;
    assigning, for each vertex of 3D vertices of the two or more sub-segments, respective two-dimensional (2D) coordinates in a texture map using a bijective parameterization; and
    applying a texture to the 3D mesh, wherein application of the texture comprises mapping the 3D vertices of the two or more sub-segments based on the respective 2D coordinates corresponding to the 3D vertices of the two or more sub-segments according to the texture map.

2. The method of claim 1, wherein modifying the 3D mesh by subdividing the first segment into the two or more sub-segments of the 3D mesh comprises:
    determining the root vertex, wherein the root vertex is the 2D coordinates of the 3D vertex of the first segment that is closest to an end of the first representative axis;
    determining a number of partitions based on the first path length of the first representative axis and the elongation value, wherein each partition has a characteristic distance;
    grouping each 2D coordinate of the 3D vertices of the first segment into one of the number of partitions by comparing distance between each 2D coordinate of the 3D vertices of the first segment and the root vertex with the characteristic distance of each partition; and
    designating, for each partition, a sub-segment defined by the 2D coordinates of the 3D vertices of the first segment in that partition.

3. The method of claim 1, wherein detecting that the first segment of the segments is elongated comprises determining that the elongation value for the first segment meets the threshold elongation value.

4. The method of claim 3, the operations further comprising:
    computing a second elongation value for a second segment of the segments;
    determining that the second elongation value does not meet the threshold elongation value; and
    opting not to subdivide the second segment, based on the second elongation value not meeting the threshold elongation value.

5. The method of claim 3, the operations further comprising:
    for additional segments in the segments of the 3D mesh, determining a respective elongation value for each additional segment; and
    computing the threshold elongation value dynamically based on the respective elongation values of the additional segments.

6. The method of claim 1, wherein assigning, for each 3D vertex of the two or more sub-segments, respective 2D coordinates in the texture map comprises packing the two or more sub-segments along with other segments of the segments into a 2D area.

7. The method of claim 1, the operations further comprising determining the segments of the 3D mesh, wherein determining the segments of the 3D mesh comprises:
    determining seams in the 3D mesh; and
    separating the 3D mesh into the segments along the seams.

8. The method of claim 1, further comprising identifying a plurality of exterior vertices of the first segment using the respective initial 2D coordinates of the 3D vertices of the first segment.

9. The method of claim 8, wherein modifying the segments of the 3D mesh by subdividing the first segment into the two or more sub-segments of the 3D mesh comprises:
    dividing the plurality of exterior vertices of the first segment into a plurality of partitions;
    identifying, for at least the first partition and a second partition of the plurality of partitions, one or more discontinuities; and
    dividing the first segment into the two or more sub-segments by dividing the first segment across the one or more discontinuities.

10. The method of claim 9, wherein:
each exterior vertex of the plurality of exterior vertices is connected to at least one other exterior vertex of the plurality of exterior vertices by a first edge; and
each discontinuity of the one or more discontinuities comprises at least two exterior vertices of the plurality of exterior vertices connected by a second edge, wherein a first exterior vertex of the at least two exterior vertices is on the first partition and a second exterior vertex of the at least two exterior vertices is on the second partition.

11. A non-transitory computer-readable medium embodying program code for segmenting a mesh to apply a texture, the program code comprising instructions that, when executed by a processor, cause the processor to perform operations comprising:
accessing segments of a three-dimensional (3D) mesh;
computing a first elongation value indicating a degree of elongation of a first segment of the segments, comprising:
assigning, for each vertex of 3D vertices of the first segment, respective initial 2D coordinates;
computing a first representative axis of the first segment using the respective initial 2D coordinates of the 3D vertices of the first segment, wherein the first representative axis represents a first dimension of the first segment, comprising:
computing a plane-portioned representation of the first segment; and
computing a skeletonized representation of the first segment based on the plane-portioned representation, wherein a longest path in the skeletonized representation is used as the first representative axis;
computing a second representative axis of the first segment using the initial 2D coordinates, wherein the second representative axis represents a second dimension of the first segment, comprising determining a longest edge in the plane-portioned representation extending from the first representative axis to a boundary of the first segment; and
computing the first elongation value as a ratio of a first path length of the first representative axis to a second path length of the second representative axis;
determining that the first elongation value meets a threshold elongation value;
based on the first elongation value meeting the threshold elongation value, subdividing the first segment into a quantity of sub-segments, comprising:
computing a chart length by dividing the first path length of the first representative axis by a number of sub-segments in the quantity of sub-segments;
partitioning vertices of the first segment, wherein the partitioning comprises assigning a first vertex of the first segment to a first partition based how many chart lengths fit in a distance between the first vertex and a root vertex; and
wherein the quantity of sub-segments is based on a comparison of the first elongation value to the threshold elongation value;
assigning, for each vertex of 3D vertices of the quantity of sub-segments, respective two-dimensional (2D) coordinates in a texture map using a bijective parameterization; and
applying the texture to the 3D mesh, wherein application of the texture comprises mapping the 3D vertices of the quantity of sub-segments based on the respective 2D coordinates corresponding to the 3D vertices of the quantity of sub-segments according to the texture map.

12. The non-transitory computer-readable medium of claim 11, wherein subdividing the first segment into the quantity of sub-segments comprises:
determining the root vertex, wherein the root vertex is the 2D coordinates of the 3D vertex of the first segment that is closest to an end of the first representative axis; and
designating, for each partition, a sub-segment defined by the 2D coordinates of the 3D vertices of the first segment in that partition.

13. The non-transitory computer-readable medium of claim 11, the operations further comprising:
computing a second elongation value for a second segment of the segments;
determining that the second elongation value does not meet the threshold elongation value; and
opting not to subdivide the second segment, based on the second elongation value not meeting the threshold elongation value.

14. The non-transitory computer-readable medium of claim 11, the operations further comprising identifying a plurality of exterior vertices of the first segment using the respective initial 2D coordinates of the 3D vertices of the first segment.

15. The non-transitory computer-readable medium of claim 14, wherein subdividing the first segment into the quantity of sub-segments comprises:
dividing the plurality of exterior vertices of the first segment into a plurality of partitions;
identifying, for at least the first partition and a second partition of the plurality of partitions, one or more discontinuities; and
dividing the first segment into the quantity of sub-segments by dividing the first segment across the one or more discontinuities.

16. A system for segmenting a mesh to apply a texture, the system comprising processing hardware configured to perform operations comprising:
accessing segments of a three-dimensional (3D) mesh;
a step for detecting that a first segment of the segments is elongated, comprising:
assigning, for each vertex of 3D vertices of the first segment, respective initial 2D coordinates;
computing a first representative axis of the first segment using the respective initial 2D coordinates of the 3D vertices of the first segment, wherein the first representative axis represents a first dimension of the first segment, comprising:
computing a plane-portioned representation of the first segment; and
computing a skeletonized representation of the first segment based on the plane-portioned representation, wherein a longest path in the skeletonized representation is used as the first representative axis;
computing a second representative axis of the first segment using the initial 2D coordinates, wherein the second representative axis represents a second dimension of the first segment, comprising determining a longest edge in the plane-portioned representation extending from the first representative axis to a boundary of the first segment;
computing an elongation value based on a first path length of the first representative axis and a second path length of the second representative axis; and determining that the elongation value meets a threshold elongation value;
a step for subdividing the first segment into two or more sub-segments of the 3D mesh, based on the first segment being elongated, comprising;
computing a chart length by dividing the first path length of the first representative axis by a number of sub-segments in the two or more sub-segments; and
partitioning vertices of the first segment, wherein the partitioning comprises assigning a first vertex of the first segment to a first partition based how many chart lengths fit in a distance between the first vertex and a root vertex;
assigning, for each vertex of 3D vertices of the two or more sub-segments, respective two-dimensional (2D) coordinates in a texture map using a bijective parameterization; and
applying the texture to the 3D mesh, wherein application of the texture comprises mapping the 3D vertices of the two or more sub-segments based on the respective 2D coordinates corresponding to the 3D vertices of the two or more sub-segments according to the texture map.

17. The system of claim 16, the operations further comprising:
computing a second elongation value for a second segment of the segments;
determining that the second elongation value does not meet the threshold elongation value; and
opting not to subdivide the second segment, based on the second elongation value not meeting the threshold elongation value.

18. The system of claim 16, wherein subdividing the first segment into the two or more sub-segments of the 3D mesh comprises:
determining the root vertex, wherein the root vertex is the 2D coordinates of the 3D vertex of the first segment that is closest to an end of the first representative axis;
determining a number of partitions based on the first path length of the first representative axis and the elongation value, wherein each partition has a characteristic distance;
grouping each 2D coordinate of the 3D vertices of the first segment into one of the number of partitions by comparing distance between each 2D coordinate of the 3D vertices of the first segment and the root vertex with the characteristic distance of each partition; and
designating, for each partition, a sub-segment defined by the 2D coordinates of the 3D vertices of the first segment in that partition.

19. The system of claim 16, the operations further comprising identifying a plurality of exterior vertices of the first segment using the respective initial 2D coordinates of the 3D vertices of the first segment.

20. The system of claim 19, wherein the step for subdividing the first segment into the two or more sub-segments of the 3D mesh comprises:
dividing the plurality of exterior vertices of the first segment into a plurality of partitions;
identifying, for at least the first partition and a second partition of the plurality of partitions, one or more discontinuities; and
dividing the first segment into the two or more sub-segments by dividing the first segment across the one or more discontinuities.

* * * * *